US012569760B2

(12) United States Patent
Zhou

(10) Patent No.: US 12,569,760 B2
(45) Date of Patent: Mar. 10, 2026

(54) MASKING A FUNCTION OF A VIRTUAL OBJECT USING A TRAP IN A VIRTUAL ENVIRONMENT

(71) Applicant: Tencent Technology (Shenzhen) Company Limited, Shenzhen (CN)

(72) Inventor: Minke Zhou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 564 days.

(21) Appl. No.: 17/978,957

(22) Filed: Nov. 1, 2022

(65) Prior Publication Data

US 2023/0052088 A1  Feb. 16, 2023

Related U.S. Application Data

(63) Continuation of application No. PCT/CN2021/123287, filed on Oct. 12, 2021.

(30) Foreign Application Priority Data

Nov. 20, 2020  (CN) .......................... 202011315218.8

(51) Int. Cl.
| *A63F 13/58* | (2014.01) |
| *A63F 13/52* | (2014.01) |
| *A63F 13/56* | (2014.01) |

(52) U.S. Cl.
CPC .............. *A63F 13/52* (2014.09); *A63F 13/56* (2014.09)

(58) Field of Classification Search
CPC ........ A63F 13/58; A63F 13/69; A63F 13/822; A63F 13/833; A63F 13/837;

(Continued)

(56) References Cited

U.S. PATENT DOCUMENTS

| 5,292,254 A * | 3/1994 | Miller ....................... F41G 3/26 |
| | | 434/11 |
| 6,569,011 B1 * | 5/2003 | Lynch ..................... A63F 13/79 |
| | | 434/22 |

(Continued)

FOREIGN PATENT DOCUMENTS

| CN | 111202983 A | 5/2020 |
| CN | 111265876 A | 6/2020 |

(Continued)

OTHER PUBLICATIONS

"Area of effect". Accessed Mar. 5, 2025. Source: https://wowwiki-archive.fandom.com/wiki/Area_of_Effect (Year: 2025).*

(Continued)

*Primary Examiner* — Steven J Hylinski
(74) *Attorney, Agent, or Firm* — ArentFox Schiff LLP

(57) ABSTRACT

A virtual object control method includes controlling display of a virtual environment image, the virtual environment image comprising a first virtual object. The method also includes, in response to the first virtual object triggering a trap set in the virtual environment, determining whether a function of the first virtual object is in an active state or an inactive state, the trap being set in the virtual environment by a second virtual object. The method further includes, in response to the first virtual object triggering a trap set in the virtual environment and in response to a determination that the function is in the active state for the first virtual object, switching the function to the inactive state.

20 Claims, 16 Drawing Sheets

(58) Field of Classification Search
CPC .............. A63F 2300/64; A63F 2300/65; A63F 2300/8029; A63F 2300/8076
See application file for complete search history.

(56) References Cited

U.S. PATENT DOCUMENTS

| | | | | |
|---|---|---|---|---|
| 2004/0259617 A1* | 12/2004 | Machida | ................. | A63F 13/45 463/5 |
| 2006/0116186 A1* | 6/2006 | Sawada | ................. | C04B 37/028 463/8 |
| 2007/0060342 A1* | 3/2007 | Sakaguchi | ............ | A63F 13/822 463/31 |
| 2009/0011808 A1* | 1/2009 | Ikematsu | .............. | A63F 13/426 463/2 |
| 2013/0079138 A1* | 3/2013 | Mizuno | ................. | A63F 13/837 463/36 |
| 2015/0177866 A1* | 6/2015 | Hwang | ................. | G06F 3/0488 345/175 |
| 2019/0213023 A1* | 7/2019 | Wang | ................. | G06F 16/2365 |
| 2020/0338452 A1 | 10/2020 | Yang | | |

FOREIGN PATENT DOCUMENTS

| | | | | |
|---|---|---|---|---|
| CN | 111389000 A | 7/2020 | | |
| CN | 111589149 A | 8/2020 | | |
| CN | 111701244 A | 9/2020 | | |
| CN | 112402966 A | 2/2021 | | |
| EP | 0605779 A1 * | 7/1994 | ............... | F41G 3/26 |
| EP | 2072098 A1 * | 6/2009 | ............ | A61K 31/40 |
| JP | H1176610 A * | 3/1999 | | |
| JP | 2017064251 A * | 4/2017 | | |
| JP | 2020074840 A * | 5/2020 | ............. | A63F 13/35 |
| WO | WO-2019024041 A1 * | 2/2019 | ............. | A63F 13/20 |

OTHER PUBLICATIONS

"Disarm concept." Published Jan. 18, 2023. Source: https://www.giantbomb.com/disarm/3015-2972/ (Year: 2023).*

"Dispel magic and area effect spells." Published Sep. 10, 2018. Source: https://www.dragonsfoot.org/forums/viewtopic.php?t=80682 (Year: 2018).*

"Field Power Effect." Accessed Mar. 5, 2025. Source: https://tvtropes.org/pmwiki/pmwiki.php/Main/FieldPowerEffect (Year: 2025).*

"X Com 2—Sharpshooter Class—Skill Tree Breakdown—Preview Gameplay," published Jan. 17, 2016. Source: https://www.youtube.com/watch?v=FGh0DECDWB0 (Year: 2016).*

"Did that alien just use an AOE ability that disables weapons?" published Jan. 18, 2016. Source: https://www.reddit.com/r/Xcom/comments/41h67d/did_that_alien_just_use_an_aoe_ability_that/ (Year: 2016).*

International Search Report and Written Opinion issued in International Application No. PCT/CN2021/123287, mailed Jan. 23, 2022, with English Translation, 10 pages.

-HCL-, Disable enemy equipment? New Bond Hextech and New Hero Skill Preview Introduction, Bilibili.com, https://www.bilibili.com/video/BV15t411u7KG/?from=search&seid=4660323647202850238&spm_id_from=333.337.0.0, Aug. 2, 2019, with English Translation, pp. 1-3.

Chinese Office Action and Search Report issued in Application No. 202011315218.8, mailed Jan. 14, 2022, with English Translation, 23 pages.

* cited by examiner

MASKING A FUNCTION OF A VIRTUAL OBJECT USING A TRAP IN A VIRTUAL ENVIRONMENT

RELATED APPLICATIONS

This application is a continuation of International Application No. PCT/CN2021/123287, entitled "VIRTUAL OBJECT CONTROL METHOD, DEVICE, TERMINAL, STORAGE MEDIUM, AND PROGRAM PRODUCT," filed on Oct. 12, 2021, which claims priority to Chinese Patent Application No. 202011315218.8, filed on Nov. 20, 2020, and entitled "VIRTUAL OBJECT CONTROL METHOD AND APPARATUS, TERMINAL, AND STORAGE MEDIUM." The entire disclosures of the prior applications are hereby incorporated by reference.

FIELD OF THE TECHNOLOGY

Embodiments of this application relate to the technical field of human-computer interaction, including a virtual object control method and apparatus, a terminal, a storage medium, and a program product.

BACKGROUND OF THE DISCLOSURE

First-person shooting (FPS) games are applications based on a three-dimensional virtual environment. Users may control virtual objects in the virtual environment to walk, run, climb, shoot, etc., and multiple users may team up online to cooperatively fulfill a certain task in the same virtual environment.

In the related art, a virtual object may be pre-equipped with various types of virtual props (e.g. machine guns, grenades, pistols, etc.) before the start of a battle, and accordingly, a user may control the virtual object to use the virtual props to cause injury to other virtual objects.

However, some of the virtual props provided in the related art have a greater prop action power and action range. If certain players use the virtual props, other players may be greatly threatened. In order to avoid being attacked by such virtual props, certain players are likely to adopt a crouch strategy, which may result in a longer duration of a single battle, thus exerting excessive processing pressure on a server.

SUMMARY

Embodiments of this disclosure provide a virtual object control method and apparatus, a terminal, a storage medium, and a program product. The technical solution is as follows.

In an embodiment, a virtual object control method includes controlling display of a virtual environment image, the virtual environment image comprising a first virtual object. The method also includes, in response to the first virtual object triggering a trap set in the virtual environment, determining whether a function of the first virtual object is in an active state or an inactive state, the trap being set in the virtual environment by a second virtual object. The method further includes, in response to the first virtual object triggering a trap set in the virtual environment and in response to a determination that the function is in the active state for the first virtual object, switching the function to the inactive state. In an embodiment, a virtual object control apparatus includes processing circuitry configured to control display of a virtual environment image, the virtual environment image comprising a first virtual object. The processing circuitry is further configured to, in response to the first virtual object triggering a trap set in the virtual environment, determine whether a function of the first virtual object is in an active state or an inactive state. The trap is set in the virtual environment by a second virtual object. The processing circuitry is also configured to, in response to the first virtual object triggering a trap set in the virtual environment and in response to a determination that the function is in the active state for the first virtual object, switch the function to the inactive state.

In an embodiment, a non-transitory computer-readable storage medium stores computer-readable instructions thereon, which, when executed by processing circuitry, cause the processing circuitry to perform a virtual object control method. The method includes controlling display of a virtual environment image, the virtual environment image comprising a first virtual object. The method also includes, in response to the first virtual object triggering a trap set in the virtual environment, determining whether a function of the first virtual object is in an active state or an inactive state, the trap being set in the virtual environment by a second virtual object. The method further includes, in response to the first virtual object triggering a trap set in the virtual environment and in response to a determination that the function is in the active state for the first virtual object, switching the function to the inactive state.

In the embodiments of this disclosure, a trap is set in a virtual environment using a virtual prop. When other virtual objects trigger the trap during movement, a first type of virtual props equipped by the virtual objects may be set as a masked state, whereby the virtual objects cannot use the first type of virtual props temporarily. A player may use the virtual prop to mask a virtual prop of a hostile player, and the type of virtual props available for a virtual object may be further enriched. Meanwhile, the player may kill the hostile player during the period when the hostile player cannot use the first type of virtual props, so as to improve the efficiency of killing other virtual objects, thereby shortening the battle duration, and further reducing the processing pressure of a server.

DESCRIPTION OF EMBODIMENTS

Figure 1:
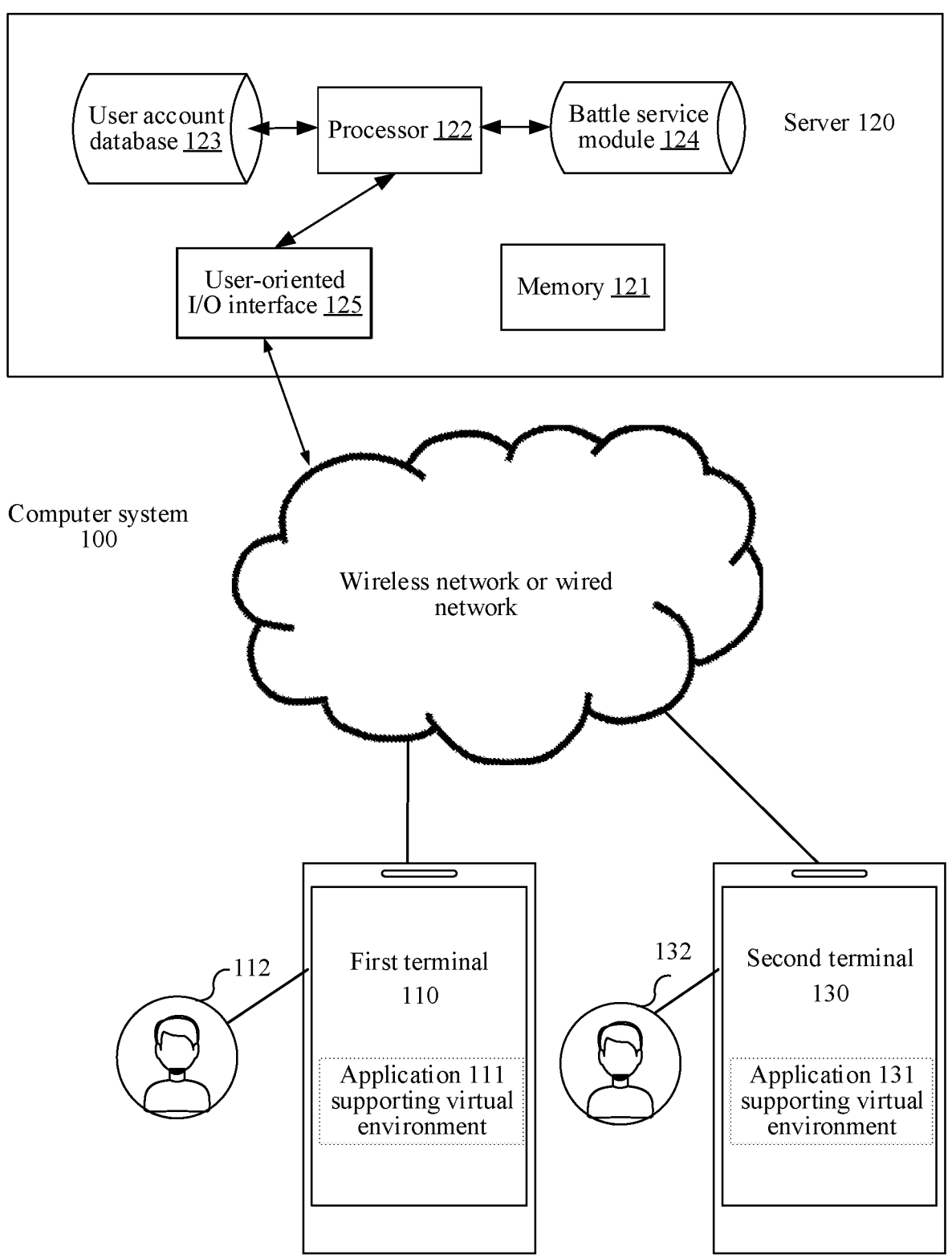
FIG. 1 shows a schematic diagram of an implementation environment according to an embodiment of this disclosure.

To explain objectives, technical solutions, and advantages of this disclosure, the following further describes implementations of this disclosure in detail with reference to the accompanying drawings.

First, terms involved in the embodiments of this disclosure are introduced:

A virtual environment includes a virtual environment displayed (or provided) by an application when run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a three-dimensional virtual environment. This is not limited in this disclosure. A description is made in the following embodiments by taking an example where the virtual environment is a three-dimensional virtual environment.

A virtual object includes a movable object in a virtual environment. The movable object may be a virtual person, a virtual animal, a cartoon character, or the like, such as a character or an animal displayed in a three-dimensional virtual environment. In an embodiment, the virtual object is a 3D model created based on a skeletal animation technology. Each virtual object has a shape and size in the 3D virtual environment, and occupies some space in the 3D virtual environment.

A Shooting game includes first-person shooting game and third-person shooting game. The first-person shooting game is a shooting game in which a user can play from a first-person perspective. A virtual environment picture (virtual environment image) in the game is a picture of a virtual environment observed from a perspective of a first virtual object. An FPS game is a shooting game played from a first-person perspective. A virtual environment picture in the game is a picture of observing a virtual environment from a third-person perspective (e.g. located behind the head of a first virtual object).

In the game, at least two virtual objects play in a single-round battle mode in the virtual environment. The virtual object escapes attacks by other virtual objects and dangers (such as a poison gas area and a swamp) in the virtual environment to survive in the virtual environment. When the hit point of the virtual object in the virtual environment is zero, the life of the virtual object in the virtual environment ends, and the final virtual object surviving in the virtual environment wins. In an embodiment, the battle starts with a moment when the first client joins the battle, and ends with a moment when the last client exits the battle. Each client may control one or more virtual objects in the virtual environment. Arena modes of the battle may include a single-player battle mode, a two-player team battle mode, or a multi-player team battle mode. The battle mode is not limited in the embodiments of this disclosure.

Virtual item are items that a virtual object can use in a virtual environment, including virtual weapons that can change attribute values of other virtual objects, supply items such as bullets, defense items such as shields, armor, and armored vehicles, virtual items displayed by hands when the virtual object releases skills such as virtual beams and virtual shock waves, and part of the torso of the virtual object such as hands and legs. The virtual props capable of changing attribute values of other virtual objects include long-range virtual props such as pistols, rifles and sniper rifles, close-range virtual props such as daggers, knives, swords, and ropes, and throw-type virtual props such as flying axes, flying knives, grenades, flash bombs and smoke grenades.

Referring to FIG. 1, a schematic diagram of an implementation environment according to an embodiment of this disclosure is shown. The implementation environment may include: a first terminal 110, a server 120, and a second terminal 130.

An application 111 supporting a virtual environment is run on the first terminal 110, and the application 111 may be a multiplayer online battle program. When the first terminal runs the application 111, a user interface of the application 111 is displayed on a screen of the first terminal 110. The application 111 may be any one of a multiplayer online battle arena (MOBA) game, a battle royale shooting game, and a simulation game (SLG). In this embodiment, an example in which the application 111 is an FPS game is used for description. The first terminal 110 is a terminal used by a first user 112. The first user 112 uses the first terminal 110 to control a first virtual object located in the virtual environment to perform activities, and the first virtual object may be referred to as a master virtual object of the first user 112. The activities of the first virtual object include, but are not limited to: at least one of adjusting body postures, crawling, walking, running, riding, jumping, driving, picking, shooting, attacking, throwing, or releasing skills. For example, the first virtual object is a first virtual character such as a simulated character or a cartoon character.

An application 131 supporting a virtual environment is run on the second terminal 130, and the application 131 may be a multiplayer online battle program. When the second terminal 130 runs the application 131, a user interface of the application 131 is displayed on a screen of the second terminal 130. The client may be any one of a MOBA game, an escape shooting game, and a simulation game (SLG). In this embodiment, an example in which the application 131 is an FPS game is used for description. The second terminal 130 is a terminal used by a second user 132. The second user 132 uses the second terminal 130 to control a second virtual object located in the virtual environment to perform activities, and the second virtual object may be referred to as a master virtual character of the second user 132. For example, the second virtual object is a second virtual character, such as a simulated character or a cartoon character.

In an embodiment, the first virtual object and the second virtual object are located in the same virtual world. The first virtual object and the second virtual object may belong to the same camp, the same team, or the same organization, have a friend relationship with each other, or have a temporary communication permission. The first virtual object and the second virtual object may belong to different camps, different teams, or different organizations, or have a hostile relationship with each other.

In an embodiment, the applications run on the first terminal 110 and the second terminal 130 are the same, or the applications run on the two terminals are the same type of applications on different operating system platforms (Android or IOS). The first terminal 110 may generally refer to one of a plurality of terminals, and the second terminal 130 may generally refer to another one of a plurality of terminals. In this embodiment, the first terminal 110 and the second terminal 130 are used as an example for description. The first terminal 110 and the second terminal 130 are of the same or different device types. The device type includes at least one of a smartphone, a tablet computer, an e-book reader, a Moving Picture Experts Group Audio Layer III (MP3) player, a Moving Picture Experts Group Audio Layer IV (MP4) player, a laptop, and a desktop computer.

FIG. 1 shows two terminals. However, a plurality of other terminals may access the server 120 in different embodiments. In an embodiment, there are one or more terminals that are terminals corresponding to the developer. A developing and editing platform for the application supporting the virtual environment is installed on the terminal. The developer can edit and update the application on the terminal and transmit an updated application installation package to the server 120 through a wired or wireless network. The first terminal 110 and the second terminal 130 can download the application installation package corresponding to the application from the server 120 to update the application.

The first terminal 110, the second terminal 130, and the another terminal are connected to the server 120 through a wireless network or a wired network.

The server 120 includes at least one of one server, a server cluster formed by a plurality of servers, a cloud computing platform, or a virtualization center. The server 120 is configured to provide background services for an application program supporting a three-dimensional virtual environment. In an embodiment, the server 120 takes on primary computing work, and the terminals take on secondary computing work. Alternatively, the server 120 takes on secondary computing work, and the terminals take on primary computing work. Alternatively, collaborative computing is performed by using a distributed computing architecture between the server 120 and the terminals.

In a schematic example, the server 120 includes a memory 121, a processor 122, a user account database 123, a battle service module 124, and a user-oriented input/output (I/O) interface 125. The processor 122 is configured to load instructions stored in the server 120, and process data in the user account database 123 and the battle service module 124. The user account database 123 is used for storing data of user accounts used by the first terminal 110, the second terminal 130, and other terminals, for example, profile pictures of the user accounts, nicknames of the user accounts, combat power indices of the user accounts, and service regions where the user accounts are located. The battle service module 124 is configured to provide multiple battle rooms for users to battle, such as 1V1 battle, 3V3 battle, and 5V5 battle. The user-oriented I/O interface 125 is configured to establish communication with the first terminal 110 and/or the second terminal 130 by using a wireless network or wired network to exchange data.

Figure 2:
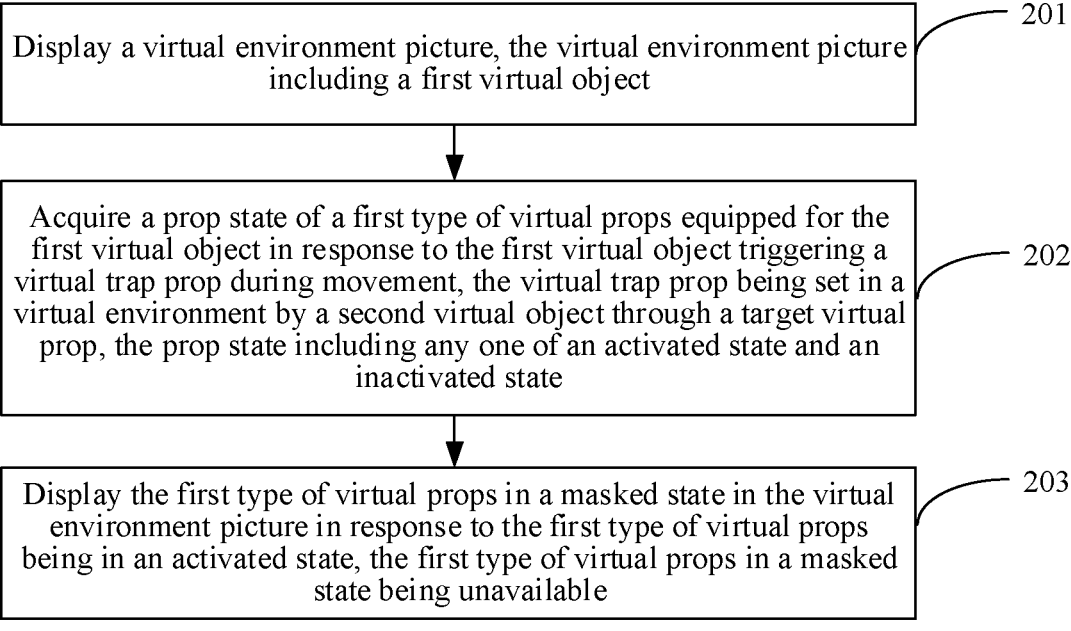
FIG. 2 shows a flowchart of a virtual object control method according to an exemplary embodiment of this disclosure.

Referring to FIG. 2, a flowchart of a virtual object control method according to an exemplary embodiment of this disclosure is shown. This embodiment is described by using an example in which the method is applied to the first terminal 110 or the second terminal 130 in the implementation environment shown in FIG. 1 or another terminal in the implementation environment. The method includes the following steps.

In step 201, a virtual environment picture is displayed. The virtual environment picture includes a first virtual object.

The method according to an embodiment of this disclosure is applicable to a virtual environment. The virtual environment includes a first virtual object and a second virtual object. The first virtual object and the second virtual object may belong to different camps or may belong to the same camp. In a possible implementation, the terminal displays the virtual environment through a virtual environment picture. In an embodiment, the virtual environment picture is a picture of the virtual environment observed from the perspective of the virtual object. Perspective is an observation angle for observation from a first-person perspective or a third-person perspective of a virtual object in a virtual environment. In an embodiment, in the embodiments of this disclosure, the perspective is an angle for observing the virtual object by using a camera model in the virtual environment.

In an embodiment, the camera model automatically follows the virtual object in the virtual environment. That is, when a position of the virtual object in the virtual environment changes, a position of the camera model following the virtual object in the virtual environment changes simultaneously, and the camera model is within a preset distance range of the virtual object in the virtual environment. In an embodiment, in the automatic following process, relative positions of the camera model and the virtual object remain unchanged.

A camera model includes a three-dimensional model located around a virtual object in a virtual environment. When a first-person viewing angle is used, the camera model is located near the head of the virtual object or at the head of the virtual object. When a third-person viewing angle is used, the camera model may be located behind the virtual object and bound to the virtual object, or may be located at any position away from the virtual object by a preset distance. The virtual object located in the virtual environment may be observed from different angles by using the camera model. In an embodiment, when the third-person viewing angle is a first-person over-shoulder viewing angle, the camera model is located behind the virtual object (for example, the head and the shoulders of the virtual character). In an embodiment, in addition to the first-person perspective and the third-person perspective, the perspective also includes other perspectives, such as a top perspective. When the top perspective is used, the camera model may be located above the head of the virtual object. The top perspective is a perspective for observing the virtual environment with an angle from the air. In an embodiment, the camera model is not actually displayed in the virtual environment. In other words, the camera model is not displayed in the virtual environment displayed in the UI.

A description is made by using an example in which the camera model is located at any position at a preset distance from the virtual object. In an embodiment, one virtual object corresponds to one camera model, and the camera model may rotate with the virtual object as a rotation center. For example, the camera model is rotated with any point of the virtual object as the rotation center. During rotation, the camera model is not only rotated, but also displaced. During rotation, a distance between the camera model and the rotation center remains unchanged, that is, the camera model is rotated on a surface of a sphere with the rotation center as a sphere center. Any point of the virtual object may be the head or the torso of the virtual object, or any point around the virtual object. This is not limited in the embodiments of this disclosure. In an embodiment, when the camera model observes the virtual object, a center of the perspective of the camera model points to a direction from a point on the spherical surface at which the camera model is located to the sphere center.

The camera model may alternatively observe the virtual object at a preset angle in different directions of the virtual object. In an embodiment, the first virtual object is a virtual object controlled by a user through the terminal. The second virtual object includes at least one of a virtual object controlled by another user and a virtual object controlled by a background server.

In an embodiment, the virtual environment picture in this embodiment of this disclosure is a picture of the virtual environment observed from the perspective of the first virtual object.

In an embodiment, the virtual environment includes at least one of the following elements: a mountain, a plain, a river, a lake, a sea, a desert, sky, a plant, a building, and a vehicle.

In an embodiment, a user interface (UI) control such as an input box, a text box or a button is included in a virtual environment interface in addition to the virtual environment picture.

In an embodiment, before displaying the virtual environment picture, the terminal firstly displays a skill prop equipment interface including prop selection controls for at least one skill prop. When the terminal receives a selection operation of a prop selection control for a target skill prop, it is determined that the first virtual object is equipped with the target skill prop.

In a possible implementation, after a user equips the first virtual object with a target skill prop in the skill prop equipment interface, the terminal displays a virtual environment picture after the user clicks a battle control and enters a battle. The virtual environment picture includes the first virtual object mainly controlled by the user. The user may control the movement of the first virtual object in the virtual environment through the terminal. The movement process of the first virtual object is displayed in the virtual environment picture correspondingly.

In an embodiment, the activities of the first virtual object controlled by the user through the terminal include, but are not limited to: at least one of adjusting body postures, crawling, walking, running, riding, jumping, driving, picking, shooting, attacking, throwing, or releasing skills. This is not limited in the embodiments of this disclosure.

In step 202, a prop state of a first type of virtual props equipped for the first virtual object is acquired in response to the first virtual object triggering a virtual trap prop during movement. For example, in response to the first virtual object triggering a trap set in the virtual environment, it is determined whether a function of the first virtual object is in an active state or an inactive state. The virtual trap prop (trap) is set in a virtual environment by a second virtual object through a target virtual prop (trap prop). The prop state includes any one of an activated state and an inactivated state.

The first virtual object and the second virtual object may belong to the same camp or may belong to different camps. In an embodiment of this disclosure, a first user controls the movement of the first virtual object in the virtual environment through a first terminal, and a second user controls the movement of the second virtual object in the virtual environment through a second terminal. That is to say, the first virtual object and the second virtual object are controlled by different terminals.

Shooting games have some ultimate skill-type weapons, such as sniper rifles, submarine guns and rifles, which have the advantages of strong lethality and wide range of injuries, and a target can be easily killed by using such ultimate skill-type weapons. In order to maintain the balance of shooting games, in a possible implementation, an embodiment of this disclosure provides a target virtual prop. After the target virtual prop is triggered, a virtual trap prop may be placed in a virtual environment, and a virtual object triggering the virtual trap prop may temporarily mask a first type of virtual props equipped therefor. That is to say, the target virtual prop is configured to deal with the first type of virtual props, and does not affect the life value of the virtual object.

The first type of virtual props may be strongly attacking ultimate skill-type weapons, such as sniper rifles, submarine guns and rifles, or killstreak weapons, such as airdrop-type virtual props, air-to-surface missiles, armed helicopters, and aerial gunboats. The first type of virtual props may be configured by a developer. This is not limited in the embodiments of this disclosure.

In a possible implementation, when the second virtual object is equipped with the target virtual prop, a virtual trap prop may be placed in the virtual environment by triggering the target virtual prop. Correspondingly, the server receives a trigger operation of the second virtual object placing the virtual trap prop, and may issue position information and special effect information of the virtual trap prop to other clients. Correspondingly, the terminal corresponding to the first virtual object may acquire a setting instruction of the virtual trap prop, and set a corresponding virtual trap prop in the virtual environment corresponding to the first virtual object.

The virtual trap prop may be visible or invisible to the first virtual object.

The virtual trap prop may be visible or invisible to a second virtual object (i.e. a virtual object placing the virtual trap prop). When the virtual trap prop is invisible to the second virtual object, in order to avoid the virtual trap prop from affecting the use of the first type of virtual props by the second virtual prop, it is possible that the second virtual object may not trigger the virtual trap prop. Alternatively, the second virtual object triggers the virtual trap prop, and the use of the first type of virtual props by the second virtual object may not be affected.

The virtual trap prop may be a projectile launched through a target virtual prop, and the projectile generates the virtual trap prop at a collision position when colliding with an obstacle. Alternatively, after triggering the target virtual prop, a virtual object is controlled to throw a target throwing object into the virtual environment, and when the target throwing object collides with an obstacle, the virtual trap prop is generated at a collision position. Alternatively, the target virtual prop corresponds to a placement control, and when a user triggers the target virtual prop, the placement control may be clicked to place the virtual trap prop at a target position in the virtual environment. The method for placing a virtual trap prop is not limited in the embodiments of this disclosure.

In a possible implementation, the virtual trap prop may be invisible and may be triggered when the user controls the movement of the first virtual object in the virtual environment.

When the virtual trap prop is placed, a collision detector may be arranged at a placement position. The collision detector is configured to determine that the virtual trap prop is triggered when a collision with a virtual object is detected. The size of the collision detector may be greater than or equal to the size of the virtual trap prop.

Since the first type of virtual props may be masked after the virtual trap prop is triggered, when the terminal determines that the first virtual object triggers the virtual trap prop during movement, a prop state of the first type of virtual props equipped for the first virtual object may be correspondingly acquired, so as to subsequently determine how to mask the first type of virtual props according to the prop state.

The prop state may include any one of an activated state and an inactivated state. The activated state indicates that if the first type of virtual props has a certain activation duration or activation condition, the first type of virtual props is in an activated state when the activation duration is reached or the activation condition is satisfied. That is to say, the first virtual object may use the first type of virtual props. Otherwise, if the first type of virtual props does not reach the activation duration or does not satisfy the activation condition, the first type of virtual props is in an inactivated state. Correspondingly, the first virtual object cannot use the first type of virtual props.

In step 203, the first type of virtual props in a masked state is displayed in the virtual environment picture in response to the first type of virtual props being in an activated state. For example, in response to a determination that a function is in the active state for the first virtual object, the function is switched to the inactive state. The first type of virtual props or a function in a masked state or an inactive state is unavailable.

The target virtual prop is configured to mask the first type of virtual props, the first type of virtual props in a masked state is unavailable, and if the first type of virtual props is also in an inactivated state, i.e. an unavailable state, it is obvious that setting the first type of virtual props as a masked state is not involved. Therefore, in a possible implementation, when it is determined that the first type of virtual props is in an activated state (available state), the first type of virtual props is set as a masked state. Correspondingly, the terminal displays the first type of virtual props in a masked state in the virtual environment picture. In the masked state, the first virtual object cannot use the first type of virtual props.

The first type of virtual props may be set as a masked state in the following manners: setting a prop control of the first type of virtual props as a non-triggerable state, and displaying, by the terminal, the prop control in a non-triggerable state in the virtual environment picture correspondingly, where the user cannot click the prop control and cannot use the first type of virtual props; or setting a use control of the first type of virtual props as a non-triggerable state, and displaying, by the terminal, the use control in a non-triggerable state in the virtual environment picture correspondingly, where the user cannot click the use control and cannot control the first type of virtual props through the use control. In an exemplary example, setting the prop control or the use control as a non-triggerable state may be: covering the prop control or the use control with mosaics, or performing grayscale display, or changing control styles, i.e. ensuring that the control cannot be triggered.

Figure 3:
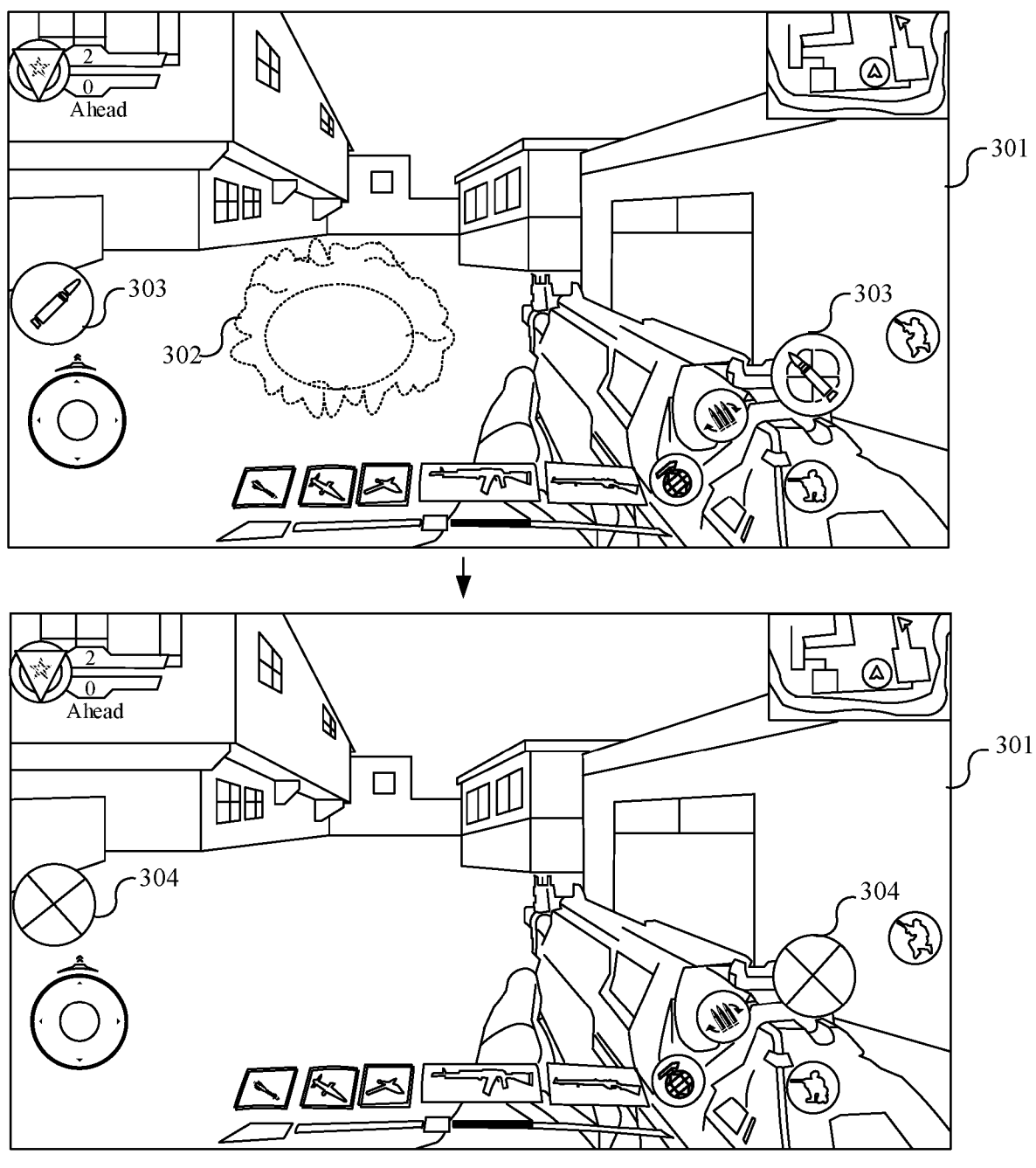
FIG. 3 shows a schematic diagram of a process in which a virtual object triggers a virtual trap prop according to an exemplary embodiment of this disclosure.

In an exemplary example, as shown in FIG. 3, a schematic diagram of a process in which a virtual object triggers a virtual trap prop according to an exemplary embodiment of this disclosure is shown. A virtual trap prop 302 is displayed in a virtual environment picture 301. The virtual trap prop 302 is invisible to the first virtual object (the virtual trap prop 302 in FIG. 3 is a dashed line). When the terminal controls the movement of the first virtual object in the virtual environment and controls the first virtual object to be using the first type of virtual props, if the first virtual object triggers the virtual trap prop 302, a use control 303 corresponding to the first type of virtual props is set as a masked state correspondingly. That is, the use control 303 is replaced with a control 304. The control 304 is in a non-triggerable state.

The process of displaying the first type of virtual props in a masked state in the virtual environment picture may be as follows. When the terminal determines that the first type of virtual props is in an activated state, the terminal sets the first type of virtual props as a masked state correspondingly. After acquiring a prop state of the first type of virtual props, the terminal may report the prop state to the server. Correspondingly, after receiving the prop state of the first type of virtual props, the server transmits a control instruction for setting the first type of virtual props as a masked state to the terminal if the prop state indicates that the first type of virtual props is in an activated state. After receiving the control instruction, the terminal may set the first type of virtual props as a masked state based on the control instruction correspondingly. In an embodiment, when determining that the first type of virtual props is in an activated state, the terminal modifies prop configuration information of the first type of virtual props to a masked state, also transmits a state check request to the server, and displays the first type of virtual props in a masked state in the virtual environment picture after receiving a state check passing instruction fed back by the server.

In conclusion, in the embodiments of this disclosure, a virtual trap prop is set in a virtual environment using a target virtual prop. When other virtual objects trigger the virtual trap prop during movement, a first type of virtual props equipped therefor may be set as a masked state, whereby other virtual props cannot use the first type of virtual props temporarily. A player may use the target virtual prop to mask a strongly attacking virtual prop of a hostile player, and the type of virtual props available for a virtual object may be further enriched. Meanwhile, the player may kill the hostile player during the period when other virtual objects cannot use the first type of virtual props, so as to improve the efficiency of killing other virtual objects, thereby shortening the battle duration, and further reducing the processing pressure of a server.

In a possible application scenario, when the first type of virtual props is set as a masked state, a use state of the first virtual object for the first type of virtual props may affect the manner of setting a masked state of the first type of virtual props. For example, if the first virtual object is using the first type of virtual props, a use control or a trigger control of the first type of virtual props may be directly set as a non-triggerable state. If the first object does not use the first type of virtual props, other virtual props may be used currently. Since only the first type of virtual props has a masking effect, it is obvious that the trigger control cannot be directly set as a non-triggerable state, which may affect the use of other virtual props by the first virtual object. Therefore, in order to avoid affecting the use of other virtual props when setting a masked state of the first type of virtual props, in a possible implementation, it is necessary to consider how to accurately mask the first type of virtual props without affecting the use of other virtual props case by case.

Figures 4, 5:
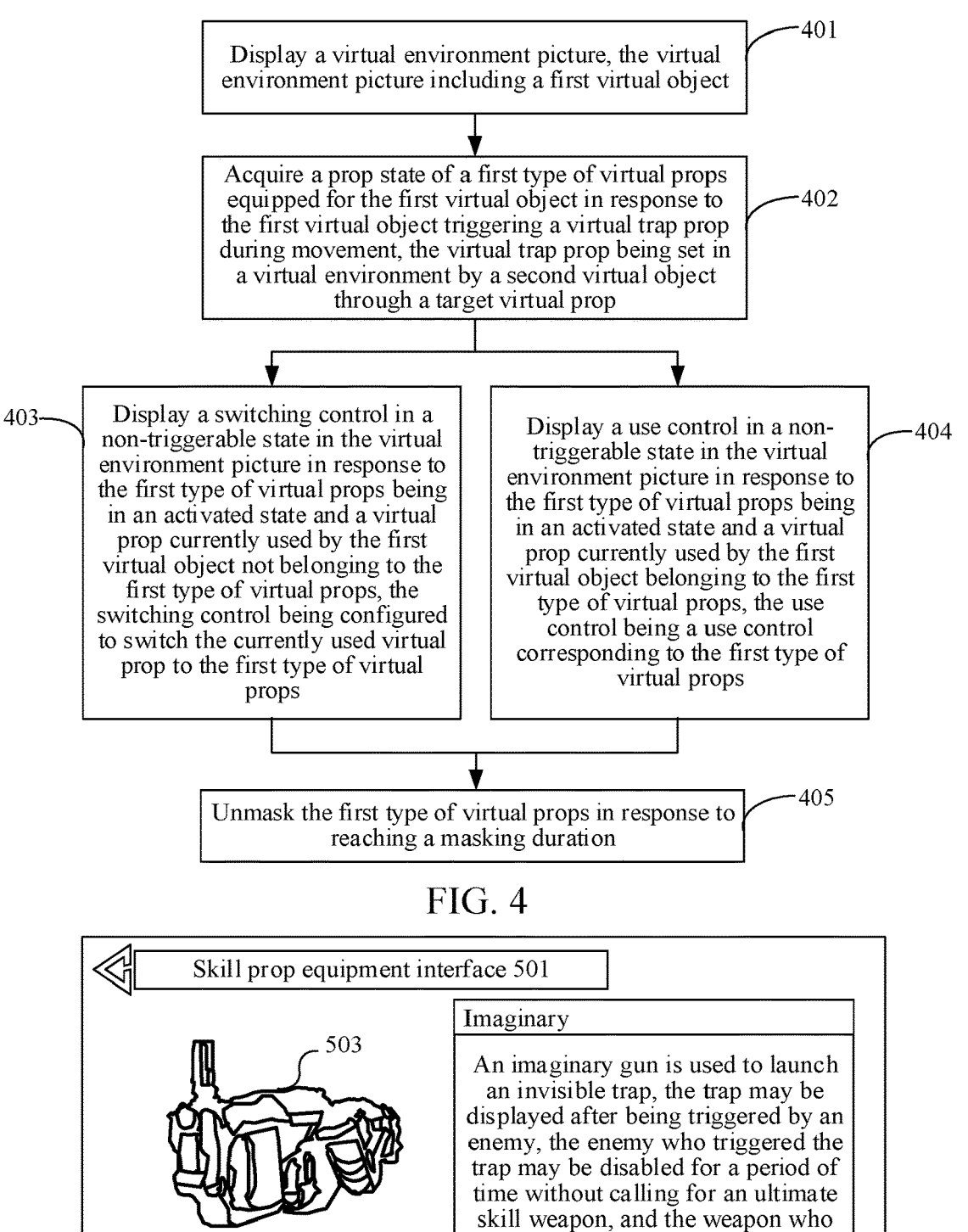
FIG. 4 shows a flowchart of a virtual object control method according to another exemplary embodiment of this disclosure.
FIG. 5 shows a schematic diagram of a skill prop equipment interface according to an exemplary embodiment of this disclosure.

In an exemplary example, as shown in FIG. 4, a flowchart of a virtual object control method according to another exemplary embodiment of this disclosure is shown. This embodiment is described by using an example in which the method is applied to the first terminal 110 or the second terminal 130 in the implementation environment shown in FIG. 1 or another terminal in the implementation environment. The method includes the following steps.

In step 401, a virtual environment picture is displayed. The virtual environment picture includes a first virtual object.

For the implementation of step 401, reference may be made to the above embodiments, and details are not described again in this embodiment.

In step 402, a prop state of a first type of virtual props equipped for the first virtual object is acquired in response to the first virtual object triggering a virtual trap prop during movement. The virtual trap prop is set in a virtual environment by a second virtual object through a target virtual prop.

In a possible implementation, a skill prop equipment interface is provided in the terminal. A user may equip the second virtual object with the target virtual prop before the start of a battle, whereby the user may trigger a use control of the target virtual prop and control the second virtual object to set the virtual trap prop in the virtual environment through the terminal after entering the battle.

Since the target virtual prop is configured to mask the first type of virtual props, the target virtual prop may be set in a skill prop equipment interface corresponding to the first type of virtual props. That is to say, the target virtual prop may belong to the first type of virtual props.

In an embodiment, when the target virtual prop belongs to the first type of virtual props, the first virtual object is equipped with the target virtual prop, and the first virtual object triggers the virtual trap prop set by the second virtual object, the first virtual object cannot use the target virtual prop.

The target virtual prop may also be set in a skill equipment interface corresponding to a virtual prop other than the first type of virtual props. That is to say, the target virtual prop may not belong to the first type of virtual props.

In an exemplary example, as shown in FIG. 5, a schematic diagram of a skill prop equipment interface according to an exemplary embodiment of this disclosure is shown. A selection control 502 corresponding to a target virtual prop 503 is displayed in a skill prop equipment interface 501. When the terminal receives a trigger operation on the selection control 502 corresponding to the target virtual prop 503, the target virtual prop 503 and a prop introduction are displayed in the skill prop equipment interface 501. When the trigger operation on an equipment control 504 is received, it is determined that the equipment operation on the target virtual prop 503 is received, and a prop equipment instruction is transmitted to the server. Correspondingly, after entering a battle, the virtual object is equipped with the target virtual prop 503.

In an embodiment, when a user equips the second virtual object with the target virtual prop and enters the battle, the target virtual prop has a certain activation duration. That is to say, the target virtual prop needs to be used after reaching the activation duration upon entering the battle.

In an embodiment, if the target virtual prop is in an inactivated state, the prop control corresponding to the target virtual prop is in a non-triggerable state, e.g. a grayscale display state. If the target virtual prop is in an activated state, the prop control corresponding to the target virtual prop is in a triggerable state, e.g. changing from a grayscale display to a highlight display.

In an embodiment, the target virtual prop has a use count threshold. That is to say, if the target virtual prop cannot be used without restriction after the virtual object equipped with the target virtual prop enters a battle, the target virtual prop cannot be continuously used after a use count of the target virtual prop reaches the use count threshold. Correspondingly, the target virtual prop may be reset as an inactivated state, and after the use count of the target virtual prop reaches the use count threshold, the target virtual prop will remain in an inactivated state until the battle ends. Schematically, the use count threshold may be set by a developer. For example, the use count threshold may be 5.

In an embodiment, the target virtual prop has a certain buffer duration. That is, each time the target virtual prop is used, the target virtual prop may be continuously used after the end of the buffer. The buffer duration may be 10 s. That is to say, a time interval between two uses of the target virtual prop is at least 10 s.

In a possible implementation, when the second virtual object is equipped with a target virtual prop, after entering a battle and reaching an activation duration of the target virtual prop, the user may click a prop control corresponding to the target virtual prop and switch to use the target virtual prop. When the terminal receives a trigger operation on a use control of the target virtual prop, a virtual trap prop may be placed in the virtual environment.

In an embodiment, for the second virtual object placing the virtual trap prop, the virtual trap prop is visible to the second virtual object, thereby avoiding the virtual trap prop from being affected.

Figure 6:
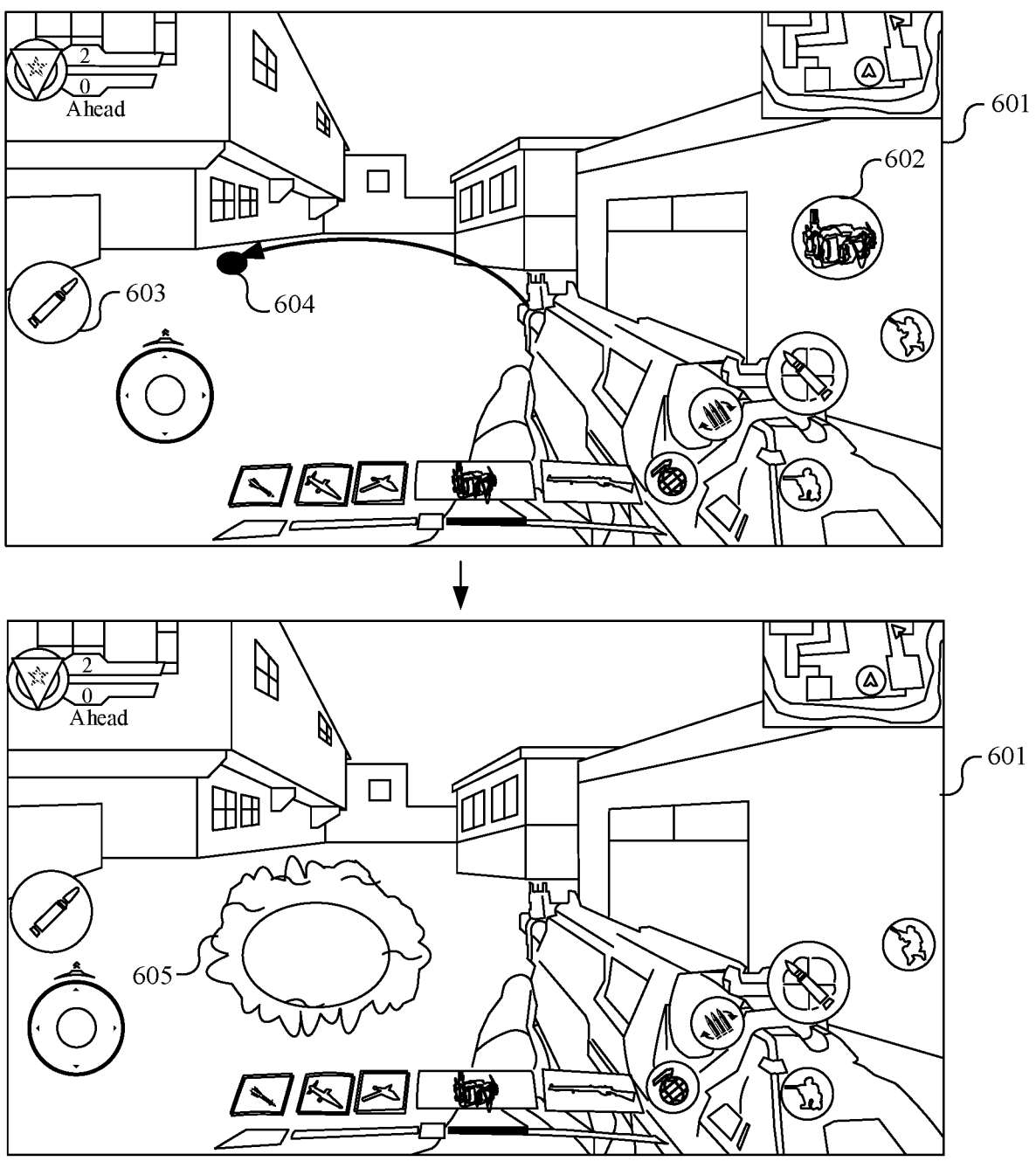
FIG. 6 shows a schematic diagram of a use process of a target virtual prop according to an exemplary embodiment of this disclosure.

In an exemplary example, as shown in FIG. 6, a schematic diagram of a use process of a target virtual prop according to an exemplary embodiment of this disclosure is shown. A prop control 602 corresponding to a target virtual prop is displayed in a virtual environment picture 601. When a terminal receives a click operation on the prop control 602, the target virtual prop is switched to be used. After the terminal receives a click operation on a use control 603 corresponding to the target virtual prop, the target virtual prop is controlled to launch a target projectile 604. When the target projectile collides with an obstacle ground, a virtual trap prop 605 is set at a collision point. In an embodiment, the virtual trap prop is visible to a prop setter (second virtual object) (a virtual trap prop 605 is a solid line).

Since shooting games belong to team battles, in order to avoid the influence of placing a virtual trap prop on a camp where a virtual object (second virtual object) is located, in a possible implementation, a display state of the virtual trap prop for the virtual object is determined by judging a relationship between a first virtual object and the second virtual object, i.e. whether the two virtual objects belong to the same camp. That is to say, if the first virtual object and the second virtual object belong to the same camp, the virtual trap prop is visible to the first virtual object, so as to avoid the first virtual object from triggering the virtual trap prop. If the first virtual object and the second virtual object belong to different camps, the virtual trap prop is set to be invisible to the first virtual object, thereby improving the success rate of using the virtual trap prop for the first virtual object.

In an exemplary example, the process of setting a virtual trap prop in a virtual environment may include the following steps.

In step 1, a prop position and a prop display state of the virtual trap prop are acquired from a server. The prop display state is a visible state in a case where the first virtual object and the second virtual object belong to a same camp, and the prop display state is an invisible state in a case where the first virtual object and the second virtual object belong to different camps.

The first virtual object and the second virtual object are controlled by different terminals, and the information interaction between different terminals needs to be performed by the server. Therefore, in a possible implementation, after the second virtual object places the virtual trap prop in the virtual environment, a control terminal corresponding to the second virtual object may upload a setting instruction of the virtual trap prop to the server. Correspondingly, after receiving the setting instruction of the virtual trap prop, the server may issue the setting instruction to other clients also including a client where the first virtual object is located.

The setting instruction may include a prop position and a prop display state corresponding to the virtual trap prop. Based on the principle of setting the display state of the virtual trap prop and the relationship between the first virtual object and the second virtual object, the server may judge the relationship between the first virtual object and the second virtual object controlled by other clients and respectively determine a visible state of each virtual object to the virtual trap prop, so as to issue a prop position and a prop display state corresponding thereto to each client. That is to say, when the server determines that the first virtual object and the second virtual object belong to the same camp, the prop display state transmitted to the client corresponding to the first virtual object is a visible state. When the server determines that the first virtual object and the second virtual object belong to different camps, the prop display state transmitted to the client corresponding to the first virtual object is an invisible state.

Correspondingly, a control terminal to which the first virtual object belongs may acquire the prop position and the prop display state of the virtual trap prop from the server. If the first virtual object and the second virtual object belong to the same camp, the prop display state received by the control terminal to which the first virtual object belongs is a visible state correspondingly. If the first virtual object and the second virtual object belong to different camps, the prop display state received by the control terminal to which the first virtual object belongs is an invisible state correspondingly.

The visible state and the invisible state may be represented by different prop display identifiers. Correspondingly, the terminal determines a display state corresponding to the virtual trap prop based on the prop display identifiers. Schematically, if the display state corresponding to the virtual trap prop is a visible state, the prop display identifier corresponding thereto may be 1. If the display state corresponding to the virtual trap prop is an invisible state, the prop display identifier corresponding thereto may be 0.

In step 2, the virtual trap prop is set in the virtual environment according to the prop position and the prop display state.

In a possible implementation, after the control terminal to which the first virtual object belongs receives the prop position and the prop display state corresponding to the virtual trap prop issued by the server, the virtual trap prop may be set at a position indicated by the prop position in the virtual environment, and it is determined whether the virtual prop is visible to the first virtual object according to the prop display state.

If the prop display state is a visible state, the first virtual object may observe the virtual trap prop correspondingly when the virtual trap prop is within the field of view of the first virtual object, thereby avoiding the first virtual object from triggering the virtual trap prop. If the prop display state is an invisible state, the first virtual object cannot observe the virtual trap prop correspondingly even if the virtual trap prop is within the field of view of the first virtual object, thereby improving the success rate of using the target virtual prop.

The invisible state may be that the virtual trap prop is set as a transparent material, or that a transparent collision detector is arranged at a prop position corresponding to the virtual trap prop. A specific prop model is not arranged. Conversely, the visible state may be that a prop model with a visible color is arranged for the virtual trap prop.

The virtual trap prop is set as an invisible state, in order to increase the probability of the virtual trap prop being triggered. In a possible implementation, when the virtual trap prop is triggered by the first virtual object and the first virtual object and the second virtual object belong to different camps, the prop display state corresponding to the virtual trap prop may be set from an invisible state to a visible state, and a prop trigger message may be transmitted to the server. The server is configured to issue, according to the prop trigger message, a prop display state change message for instructing to set the prop display state corresponding to the virtual trap prop from an invisible state to a visible state.

In order to avoid the waste of the virtual trap prop (target virtual prop) caused by the fact that the virtual trap prop that is not used is visible to all virtual objects as the virtual trap prop is triggered by the second virtual object or triggered by other virtual objects belonging to the same camp as the second virtual object, in a possible implementation, after the virtual trap prop is triggered, it may be judged whether the virtual object triggering the virtual trap prop belongs to the same camp as the virtual object setting the virtual trap prop. If the virtual objects belong to the same camp, the virtual trap prop is still invisible to other virtual objects belonging to a hostile camp. If the virtual objects do not belong to the same camp, the virtual trap prop is visible to all virtual objects.

In a case where the first virtual object and the second virtual object belong to different camps, when the virtual trap prop is not triggered, the virtual trap prop is invisible to the first virtual object. When the virtual trap prop is triggered, the display state of the virtual trap is changed from an invisible state to a visible state. That is to say, the virtual trap prop is visible to the first virtual object, whereby the first virtual object may be out of the trigger range of the virtual trap prop.

In an embodiment, if the virtual trap prop is triggered, the display state of the virtual trap prop will be changed. Correspondingly, regardless of whether the first virtual object or other virtual objects and the second virtual object belong to the same camp, the virtual trap prop is visible to all virtual objects.

The virtual trap prop is triggered by the first virtual object, and different virtual objects are controlled by different terminals. Therefore, in order to update display states of virtual trap props in all terminals, in a possible implementation, after detecting that the virtual trap prop is triggered, a controlled terminal to which the first virtual object belongs transmits a prop trigger message to the server. The prop trigger message may include a prop position of the virtual trap prop or a prop identifier of the virtual trap prop. Correspondingly, when receiving the prop trigger message, the server may issue a prop display state change message to other clients according to the virtual trap prop indicated in the prop trigger message. After receiving the prop display state change message, the other clients may set a prop display state corresponding to the virtual trap prop from an invisible state to a visible state.

The server may transmit a prop display state change message to all clients. If the virtual objects controlled by the clients and the second virtual object belong to the same camp, i.e. the prop display state corresponding to the virtual trap prop is a visible state, the visible state is continuously maintained. If the virtual objects controlled by the clients and the second virtual object belong to different camps, i.e. the prop display state of the virtual trap prop is an invisible state, the prop display state corresponding to the virtual trap prop is set from an invisible state to a visible state according to the prop display state change message.

The server may issue a prop display state change message to a client to which a virtual object belonging to different camps from the second virtual object belongs by judging the relationship between other virtual objects and the second virtual object.

Figure 7:
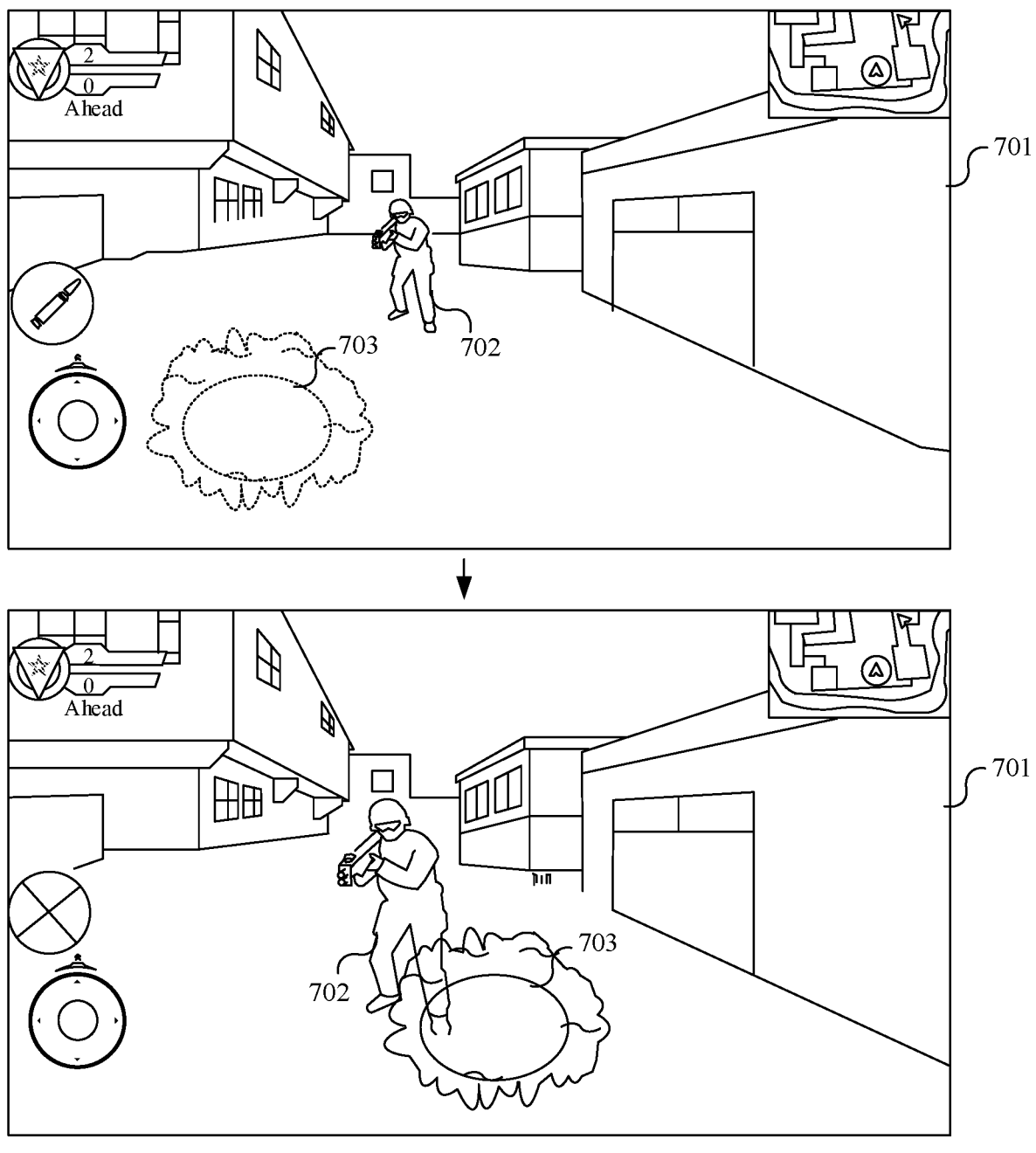
FIG. 7 shows a schematic diagram of change of a display state of a virtual trap prop after being triggered according to an exemplary embodiment of this disclosure.

In an exemplary example, as shown in FIG. 7, a schematic diagram of change of a display state of a virtual trap prop after being triggered according to an exemplary embodiment of this disclosure is shown. In a virtual environment picture 701, a first virtual object 702 is moving in a virtual environment, and the first virtual object 702 and a second virtual object belong to different camps. A virtual trap prop 703 is placed in the virtual environment by the second virtual object. When the virtual trap prop 703 is not triggered, the virtual trap prop 703 is in an invisible state (represented by a dotted line) in the virtual environment where the first virtual object 702 is located. When the virtual trap prop 703 is triggered by the first virtual object 702, the virtual trap prop 703 is in a visible state (represented by a solid line) in the virtual environment where the first virtual object 702 is located.

In step 403, a switching control in a non-triggerable state is displayed in the virtual environment picture in response to the first type of virtual props being in an activated state and a virtual prop currently used by the first virtual object not belonging to the first type of virtual props. The switching control is configured to switch the currently used virtual prop to the first type of virtual props.

In a possible implementation, after the first virtual object triggers the virtual trap prop, a prop state of the first type of virtual props equipped for the first virtual object is acquired, and the first type of virtual props is set as an unavailable state when the prop state is an activated state.

There may be two cases after the first type of virtual props is in an activated state. In the first case, the first virtual object is using the first type of virtual props. In the second case, the first virtual object does not use the first type of virtual props but may be using other virtual props. Therefore, in order to avoid the influence of masking other virtual props used by the first virtual object through the use control, in a possible implementation, a use state of the first type of virtual props by the first virtual object is judged to respectively determine how to mask the first type of virtual props. When a virtual prop currently used by the first virtual object does not belong to the first type of virtual props, a switching control of the first type of virtual props may be masked in order to avoid the influence of masking other virtual props used by the first virtual object through the use control and to avoid the first virtual object from switching to use the first type of virtual props, and the switching control in a non-triggerable state is displayed in the virtual environment picture corresponding to the terminal, whereby the user cannot switch the currently used virtual prop to the first type of virtual props through the switching control.

In an embodiment, the process of displaying the switching control in a non-triggerable state in the virtual environment picture is as follows. When the terminal learns that the virtual prop currently used by the first virtual object does not belong to the first type of virtual props, the switching control corresponding to the first type of virtual props is directly set as a non-triggerable state, and the terminal displays the switching control in a non-triggerable state correspondingly. That is to say, after the first virtual object triggers the virtual trap prop, the first virtual object is not allowed to switch from the currently used virtual prop to the first type of virtual props. After acquiring the virtual prop currently used by the first virtual object, the terminal may transmit prop information of the virtual prop to the server, and the server judges whether the currently used virtual prop belongs to the first type of virtual props. When determining that the virtual prop currently used by the first virtual object does not belong to the first type of virtual props, the server may transmit a switching control masking instruction to the terminal. After receiving the switching control masking instruction, the terminal displays the switching control in a non-triggerable state in the virtual environment picture correspondingly.

Setting the switching control corresponding to the first type of virtual props as a non-triggerable state may be: covering the switching control with mosaics or performing grayscale display on the switching control. This is not limited in the embodiments of this disclosure.

The switching control may be a use control of the first type of virtual props.

Figure 8:
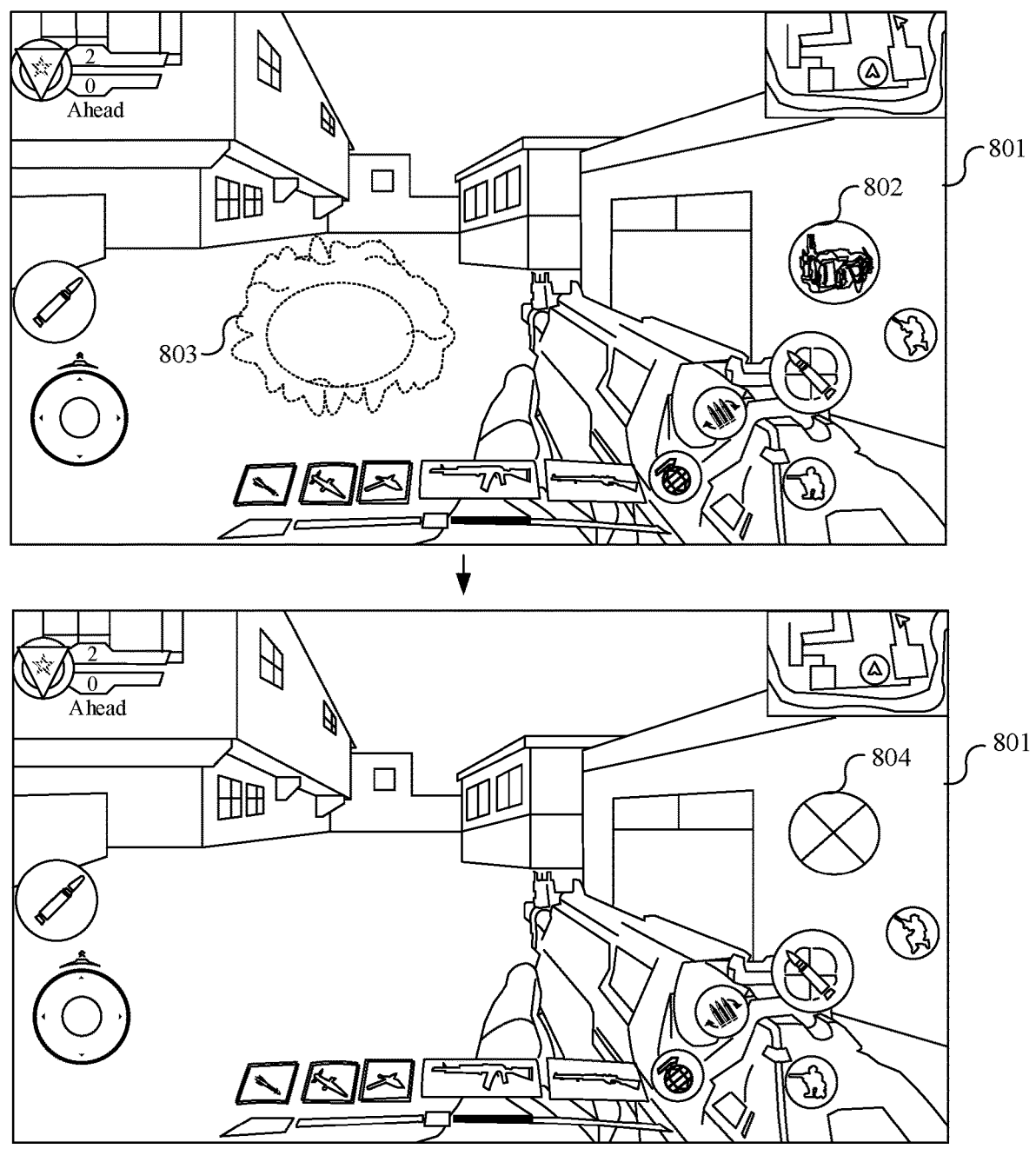
FIG. 8 shows a schematic diagram of setting a switching control as a non-triggerable state according to an exemplary embodiment of this disclosure.

In an exemplary example, as shown in FIG. 8, a schematic diagram of setting a switching control as a non-triggerable state according to an exemplary embodiment of this disclosure is shown. A first virtual object moves in a virtual environment. A switching control 802 corresponding to a first type of virtual props is displayed in a virtual environment picture 801. The switching control 802 is in a triggerable state. After the first virtual object triggers a virtual trap prop 803, the switching control 802 is set as a non-triggerable state. Correspondingly, the switching control 802 is updated to a prop control 804. The prop control 804 is non-triggerable.

In an embodiment, a target virtual prop has a certain masking duration for the first type of virtual props. That is to say, when the first virtual object triggers the virtual trap prop, the first virtual object cannot use the first type of virtual props within the masking duration.

When the first type of virtual props of the first virtual object is set as a masked state, in order to remind a user of the timing for unmasking the first type of virtual props whereby the user may learn the masked state of the first type of virtual props in time so as to further deploy a relevant battle strategy, in a possible implementation, when the terminal sets a switching control corresponding to the first type of virtual props as a non-triggerable state, that is, while the terminal displays a switching control in a non-triggerable state in the virtual environment picture, a masking countdown may also be displayed on the switching control so as to remind the user in time.

The masking countdown may be displayed at other positions.

Figure 9:
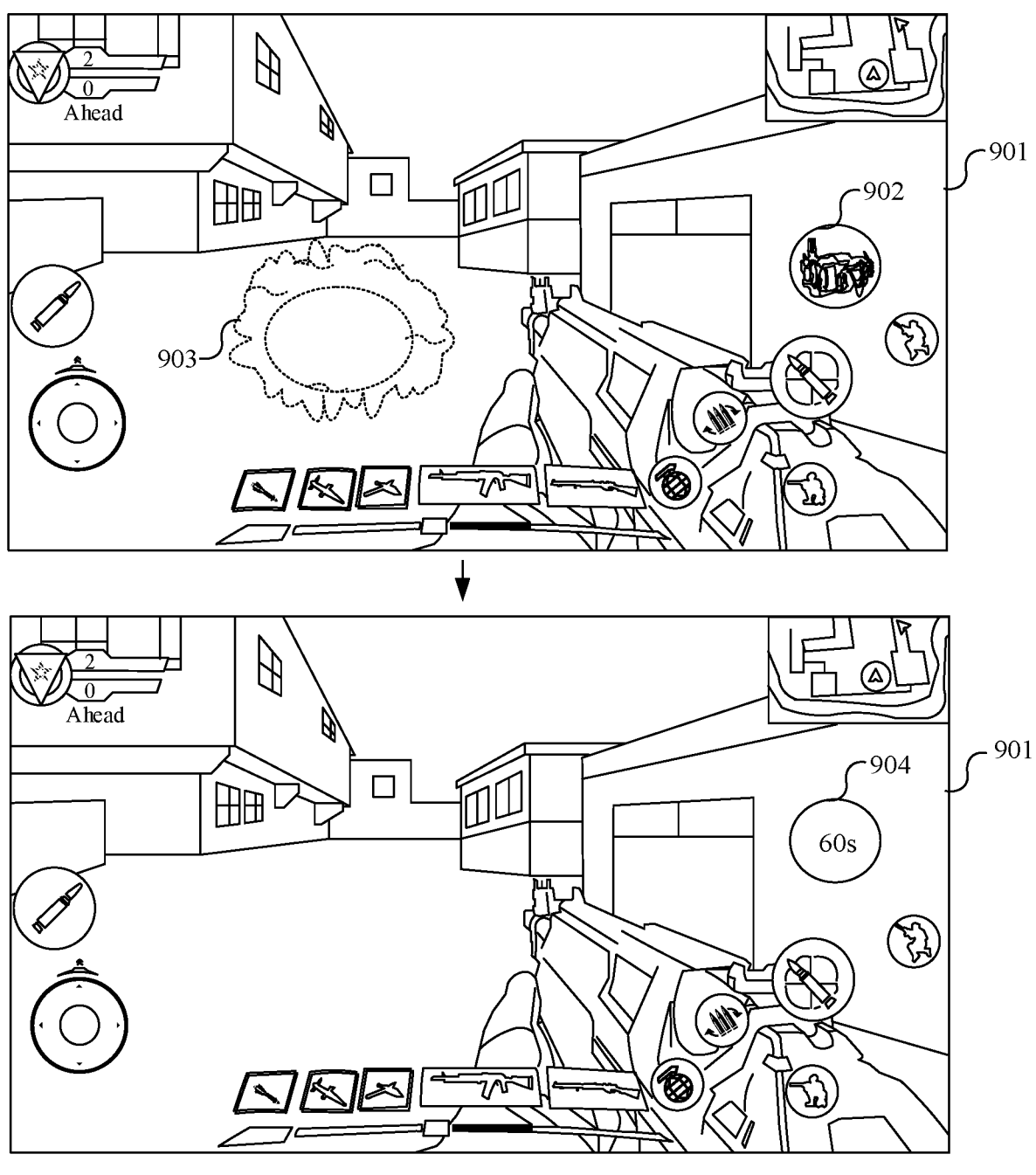
FIG. 9 shows a schematic diagram of a switching control being set as a non-triggerable state according to another exemplary embodiment of this disclosure.

In an exemplary example, as shown in FIG. 9, a schematic diagram of a switching control being set as a non-triggerable state according to another exemplary embodiment of this disclosure is shown. A first virtual object moves in a virtual environment. A switching control 902 corresponding to a first type of virtual props is displayed in a virtual environment picture 901. The switching control 902 is in a triggerable state. After the first virtual object triggers a virtual trap prop 903, the switching control 902 is set as a non-triggerable state. Correspondingly, the switching control 902 is updated to a prop control 904. The prop control 904 is non-triggerable, and a masking countdown "60 s" is displayed in the prop control 904.

In step 404, a use control in a non-triggerable state is displayed in the virtual environment picture in response to the first type of virtual props being in an activated state and a virtual prop currently used by the first virtual object belonging to the first type of virtual props. The use control is a use control corresponding to the first type of virtual props.

In another possible implementation, when the terminal detects that the first virtual object triggers the virtual trap prop and the first virtual object is using the first type of virtual props, a use control or a fire control of the first type of virtual props may be directly masked. Correspondingly, the terminal displays a use control in a non-triggerable state in the virtual environment picture. The use control is the use control of the first type of virtual props, whereby the first virtual object cannot continuously use the first type of virtual props.

The process of displaying the use control in a non-triggerable state by the terminal may be as follows. When the terminal determines that the virtual prop currently used by the first virtual object does not belong to the first type of virtual props, control parameters of the use control corresponding to the first type of virtual props may be directly modified, whereby, the use control in a non-triggerable state is displayed in the virtual environment picture. After acquiring the virtual prop currently used by the first virtual object, the terminal may transmit prop information of the virtual prop to the server, and the server judges whether the current virtual prop belongs to the first type of virtual props. When determining that the virtual prop currently used by the first virtual object belongs to the first type of virtual props, the server may transmit a use control masking instruction to the terminal. After receiving the use control masking instruction, the terminal displays the use control in a non-triggerable state in the virtual environment picture correspondingly.

Setting the use control as a non-triggerable state may be: covering the use control with mosaics or performing grayscale display on the use control. This is not limited in the embodiments of this disclosure.

Figure 10:
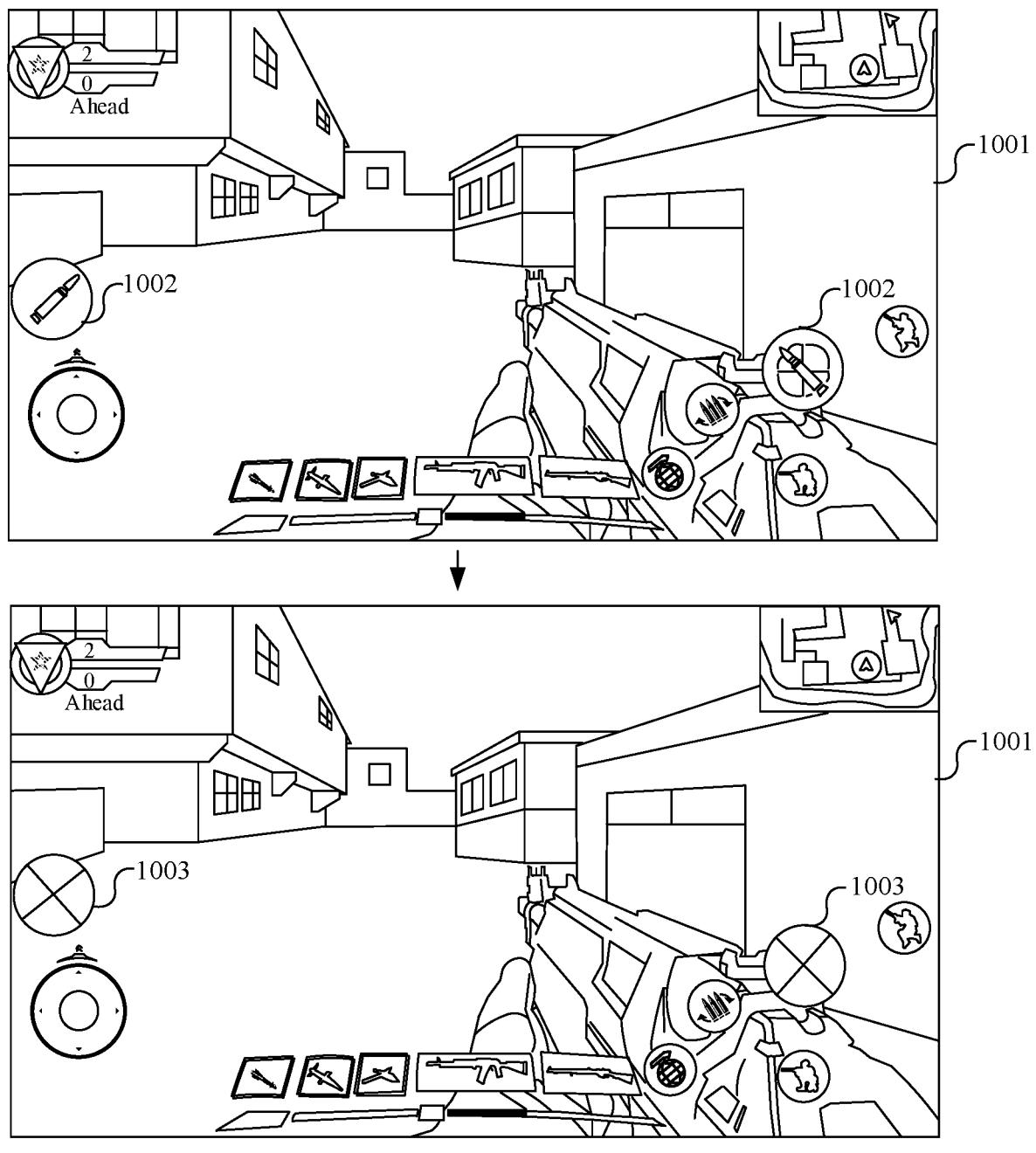
FIG. 10 shows a schematic diagram of setting a use control as a non-triggerable state according to an exemplary embodiment of this disclosure.

In an exemplary example, as shown in FIG. 10, a schematic diagram of setting a use control as a non-triggerable state according to an exemplary embodiment of this disclosure is shown. A first virtual object moves in a virtual environment, and the first virtual object is using a first type of virtual props. A use control 1002 corresponding to the first type of virtual props is displayed in a virtual environment picture 1001. The use control 1002 is in a triggerable state. After the first virtual object triggers a virtual trap prop, the use control 1002 is set as a non-triggerable state. Correspondingly, the use control 1002 is updated to a control 1003. The control 1003 is in a non-triggerable state.

In an example where the use control is set as a non-triggerable state, in order to remind a user of the timing for using the use control, in a possible implementation, when the terminal sets the use control corresponding to the first type of virtual props as a non-triggerable state, that is, when the terminal displays the use control in a non-triggerable state in the virtual environment picture, a masking countdown may be displayed on the use control so as to remind the user in time.

Figure 11:
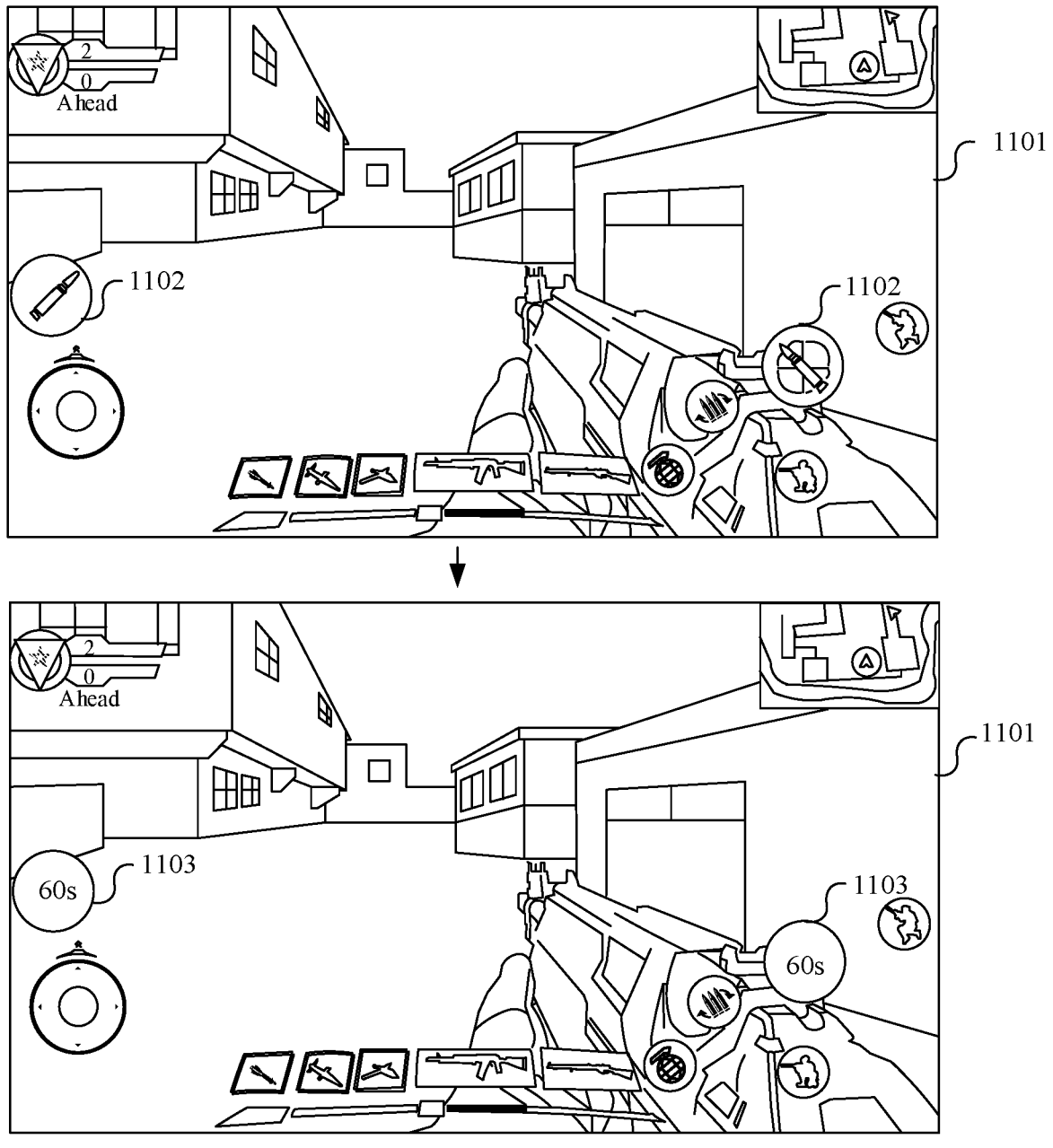
FIG. 11 shows a schematic diagram of setting a use control as a non-triggerable state according to another exemplary embodiment of this disclosure.

In an exemplary example, as shown in FIG. 11, a schematic diagram of setting a use control as a non-triggerable state according to another exemplary embodiment of this disclosure is shown. A first virtual object moves in a virtual environment, and the first virtual object is using a first type of virtual props. A use control 1102 corresponding to the first type of virtual props is displayed in a virtual environment picture 1101. The use control 1102 is in a triggerable state. After the first virtual object triggers a virtual trap prop, the use control 1102 is set as a non-triggerable state. Correspondingly, the use control 1102 is updated to a control 1103. The control 1103 is in a non-triggerable state, and a masking duration "60 s" is displayed on the control 1103.

In step 405, the first type of virtual props is unmasked in response to reaching a masking duration.

The masking duration may be preset by a developer. For example, the masking duration may be 60 s.

In a possible implementation, when the first type of virtual props corresponding to the first virtual object is in a masked state, the terminal may acquire a duration of the first type of virtual props in a masked state in real time. If a masking duration is reached, the first type of virtual props is correspondingly unmasked.

Unmasking the first type of virtual props may include: setting the switching control corresponding to the first type of virtual props from a non-triggerable state to a triggerable state, or setting the use control corresponding to the first type of virtual props from a non-triggerable state to a triggerable state.

In this embodiment, a use state of the first virtual object on the first type of virtual props is acquired, and it is determined how to set the first type of virtual props as an unavailable state based on the use state. It is possible to avoid affecting the first virtual object using other virtual props when the first virtual object does not use the first type of virtual props. Furthermore, a prop display state of the virtual trap prop in the virtual environment is set. That is, when the virtual trap prop is not triggered, the virtual trap prop is set to be invisible to a virtual object belonging to different camps from the second virtual object, thereby improving the success rate of using the virtual trap prop. The virtual trap prop is set to be visible to a virtual object belonging to the same camp as the second virtual object, thereby avoiding the virtual trap prop from threatening teammates. In addition, by setting a masking duration countdown, the user may be made aware of the masked state of the first type of virtual props in time.

In the above embodiments, if the first type of virtual props is in an activated state after the first virtual object triggers the virtual trap prop, the first type of virtual props may be set as an unavailable state. If the first type of virtual props is in an inactivated state, an operation of setting the first type of virtual props as a masked state may not be executed, thereby causing that the target virtual prop is invalid for the first virtual object. In a possible implementation, if it is determined that the first type of virtual props is in an inactivated state, an activation countdown of the first type of virtual props may be prolonged, so as to realize the restraint effect of the target virtual prop on the first type of virtual props.

In an exemplary example, if the first type of virtual props is in an inactivated state and becomes activated after 30 s, an activation duration of the first type of virtual props may be prolonged by 60 s. That is to say, the first type of virtual props may be in an activated state after 90 s.

As can be seen from the above embodiments, when the virtual trap prop is triggered, the virtual trap prop is visible to all virtual objects. Within the masking duration, a player may not be able to use a suitable virtual prop, which may reduce the participation enthusiasm of the player. In order to improve the enthusiasm of the player for a battle, in a possible implementation, the virtual trap prop is set to have a certain life value, and the player may control the virtual object to attack the virtual trap prop through the terminal. If the life value of the virtual trap prop is reduced to 0, a masking operation triggered by the virtual trap prop may be immediately released.

Figure 12:
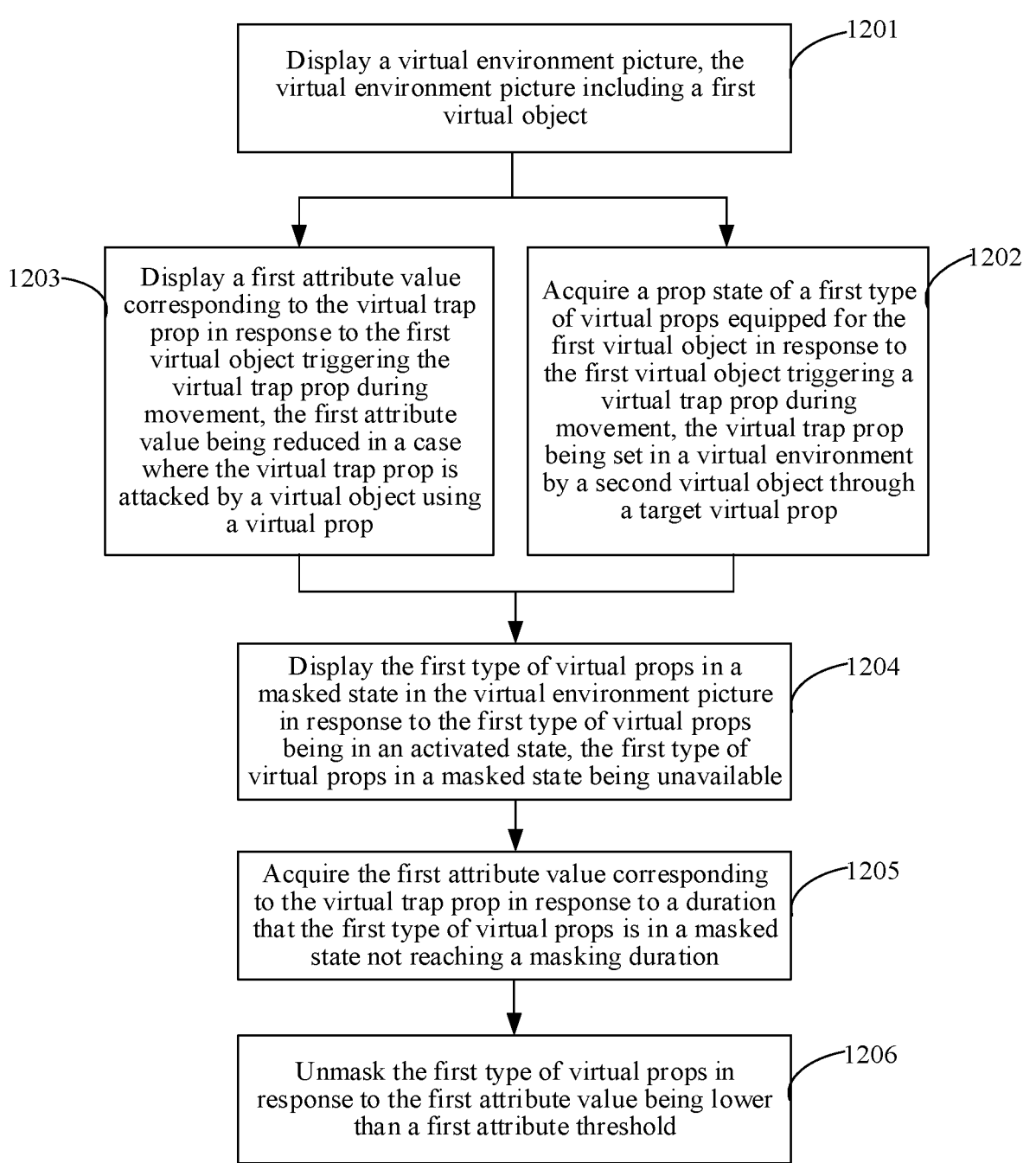
FIG. 12 shows a flowchart of a virtual object control method according to another exemplary embodiment of this disclosure.

In a possible implementation, as shown in FIG. 12, a flowchart of a virtual object control method according to another exemplary embodiment of this disclosure is shown. This embodiment is described by using an example in which the method is applied to the first terminal 110 or the second terminal 130 in the implementation environment shown in FIG. 1 or another terminal in the implementation environment. The method includes the following steps.

In step 1201, a virtual environment picture is displayed. The virtual environment picture includes a first virtual object.

In step 1202, a prop state of a first type of virtual props equipped for the first virtual object is acquired in response to the first virtual object triggering a virtual trap prop during movement. The virtual trap prop is set in a virtual environment by a second virtual object through a target virtual prop.

For the implementations of steps 1201 and 1202, reference may be made to the above embodiments, and details are not described again in this embodiment.

In step 1203, a first attribute value corresponding to the virtual trap prop is displayed in response to the first virtual object triggering the virtual trap prop during movement. The first attribute value is reduced in a case where the virtual trap prop is attacked by a virtual object using a virtual prop.

The first attribute value may be a blood volume, a life value or a defense value of the virtual trap prop. The first attribute value is set by a developer.

Since the virtual trap prop has a visible state and an invisible state, the corresponding first attribute value may also have a visible state and an invisible state. The first attribute value is in a visible state when the virtual trap prop is triggered.

In a possible implementation, after the first virtual object triggers the virtual trap prop during movement, the corresponding first attribute value may be displayed at the virtual trap prop. The first attribute value is reduced correspondingly when the virtual trap prop is attacked by other virtual objects using the virtual prop.

When setting the virtual trap prop, the terminal may arrange a second collision detector at a position where the virtual trap prop is located. The second collision detector is configured to detect whether the virtual trap prop is attacked by other virtual objects using the virtual prop. If the virtual trap prop is attacked, a first attribute value of the virtual trap prop is correspondingly reduced.

The size of the second collision detector may be less than or equal to the size of a first collision detector. The first collision detector is configured to determine whether the virtual trap prop is triggered by the virtual object.

Figure 13:
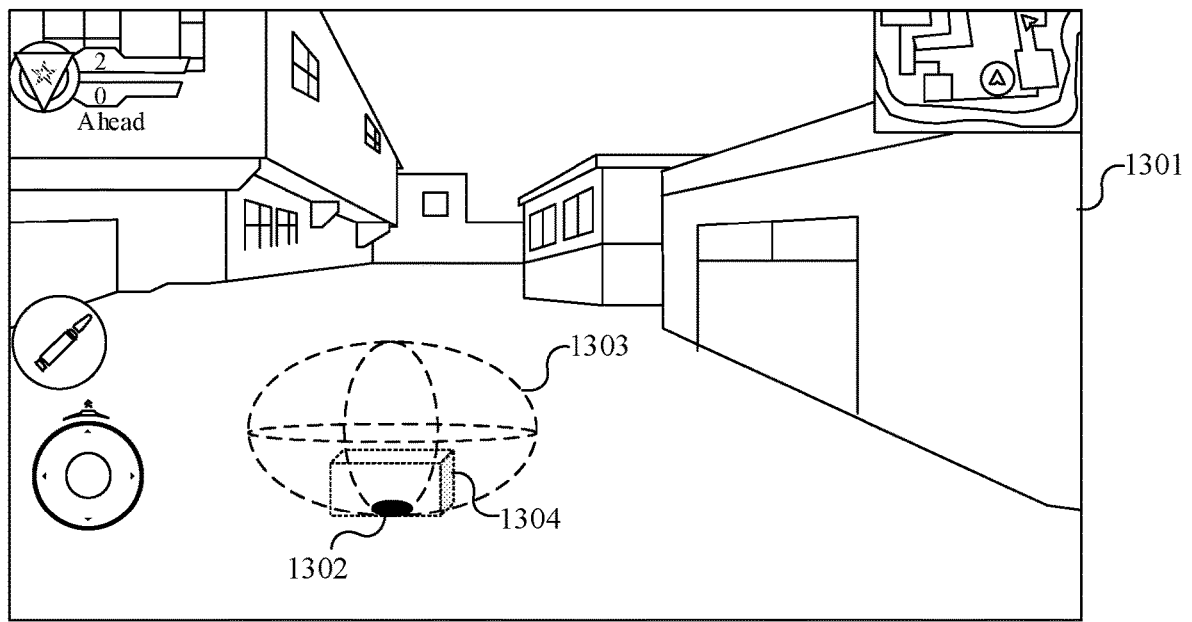
FIG. 13 shows a schematic diagram of a collision detector corresponding to a virtual trap prop according to an exemplary embodiment of this disclosure.

In an exemplary example, as shown in FIG. 13, a schematic diagram of a collision detector corresponding to a virtual trap prop according to an exemplary embodiment of this disclosure is shown. When a virtual trap prop is set in a virtual environment, a collision detector is arranged for the virtual trap prop at the same time. Correspondingly, a first collision detector 1303 and a second collision detector 1304 corresponding to a virtual trap prop 1302 are arranged in a virtual environment picture 1301. The first collision detector 1303 is configured to determine that the virtual trap prop 1302 is triggered when a collision with a virtual object is detected. The second collision detector 1304 is configured to detect a collision when other virtual objects attack the virtual trap prop 1302 using the virtual prop after the virtual trap prop 1302 is triggered. In an embodiment, the first collision detector 1303 and the second collision detector 1304 are invisible.

The first collision detector and the second collision detector may be a collision detector. The function of the first collision detector is realized when the virtual trap prop is not triggered, and the functions of the first collision detector and the second collision detector are realized after the virtual trap prop is triggered. Alternatively, the function of the second collision detector is realized after the virtual trap prop is triggered.

After the virtual trap prop is triggered, the first attribute value may not be displayed, but it still has the first attribute value, which may be reduced when the virtual trap prop is attacked by the virtual object using the virtual prop. When the virtual trap prop is triggered, the first attribute value may be visible only to a setter of the virtual trap prop, or to the virtual object of a camp where the setter of the virtual trap prop is located, whereby the lifetime of the virtual trap prop may be estimated.

Figure 14:
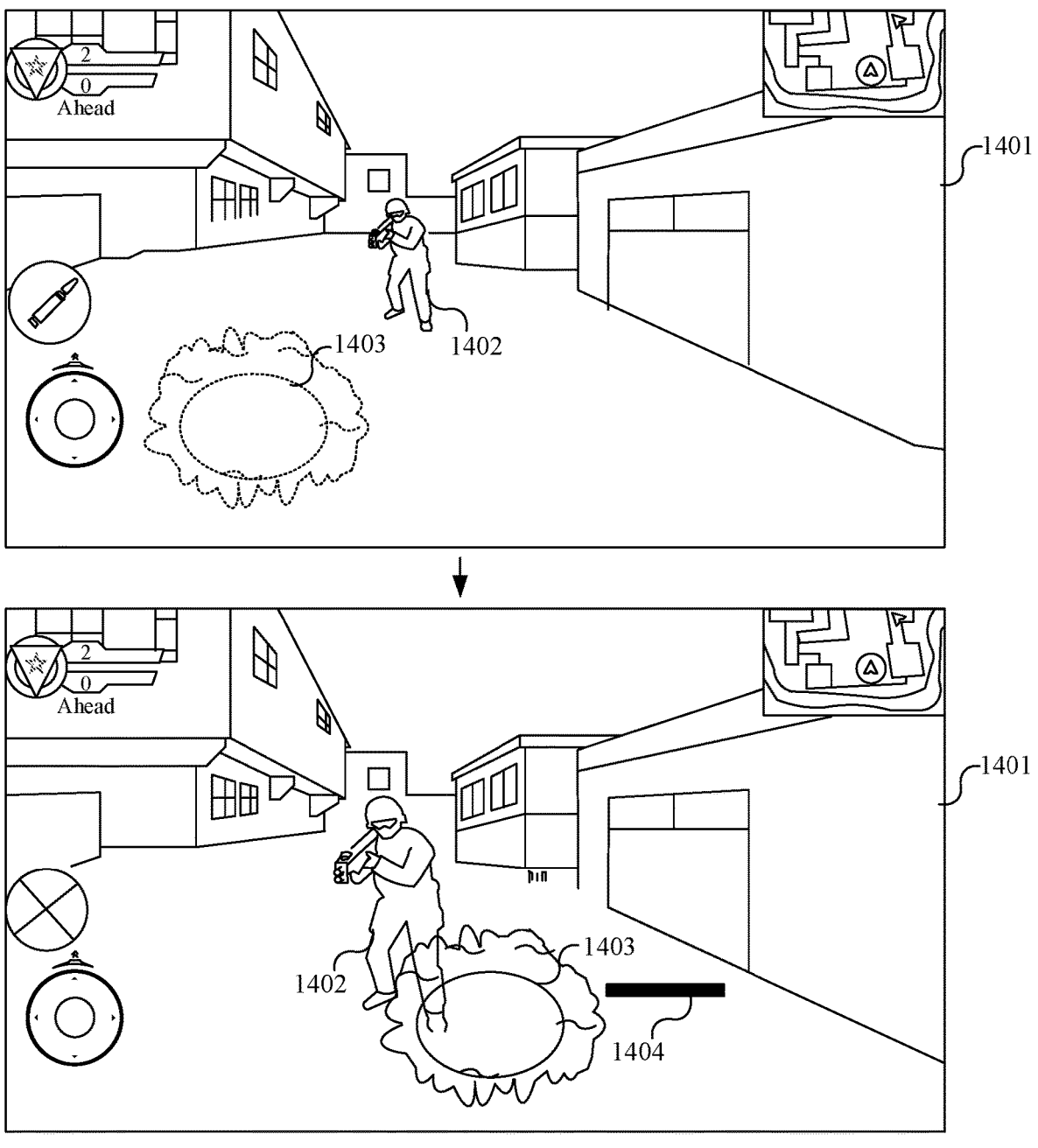
FIG. 14 shows a schematic diagram of change of a virtual trap prop after being triggered according to an exemplary embodiment of this disclosure.

In an exemplary example, as shown in FIG. 14, a schematic diagram of change of a virtual trap prop after being triggered according to an exemplary embodiment of this disclosure is shown. In a virtual environment picture 1401, a first virtual object 1402 is moving in a virtual environment, and the first virtual object 1402 and a second virtual object belong to different camps. A virtual trap prop 1403 is placed in the virtual environment by the second virtual object. When the virtual trap prop 1403 is not triggered, the virtual trap prop 1403 is in an invisible state (represented by a dotted line) in the virtual environment where the first virtual object 1402 is located. When the virtual trap prop 1403 is triggered by the first virtual object 1402, the virtual trap prop 1403 is in a visible state (represented by a solid line) in the virtual environment where the first virtual object 1402 is located, and an attribute control 1404 for the virtual trap prop 1403 is displayed around the virtual trap prop 1403.

In step 1204, the first type of virtual props in a masked state is displayed in the virtual environment picture in response to the first type of virtual props being in an activated state. The first type of virtual props in a masked state is unavailable.

For the implementation of step 1204, reference may be made to the above embodiments, and details are not described again in this embodiment.

In step 1205, the first attribute value corresponding to the virtual trap prop is acquired in response to a duration that the first type of virtual props is in a masked state not reaching a masking duration.

Since the virtual trap prop has a certain life value, other virtual objects may use the virtual prop to attack the virtual trap prop correspondingly. After the life value of the virtual trap prop is 0, even if the masking duration is not reached, the first type of virtual props may be unmasked immediately.

When the first type of virtual props corresponding to the first virtual object is in a masked state, the type of virtual props available for the first virtual object may be determined according to a masking type.

When a virtual prop currently used by the first virtual object does not belong to the first type of virtual props, virtual props equipped for the first virtual object other than the first type of virtual props may be switched to be used.

When a virtual prop currently used by the first virtual object belongs to the first type of virtual props, other virtual props in the first type of virtual props and virtual props other than a second type of virtual props cannot be switched to be used by the first virtual object. That is, all virtual props equipped for the first virtual object other than the second type of virtual props are set as a masked state.

The second type of virtual props includes at least one of throw-type virtual props (grenades), treatment-type virtual props (first-aid kits), defense-type virtual props (protective screens), and close range-type virtual props (pistols). That is to say, the first virtual object may only switch to use the second type of virtual props. For example, throw-type virtual props: grenades are switched to be used.

In a possible implementation, the first attribute value corresponding to the virtual trap prop is acquired in time when a duration that the first type of virtual props is in a masked state does not reach a masking duration.

In step 1206, the first type of virtual props is unmasked in response to the first attribute value being lower than a first attribute threshold.

The first attribute threshold may be set by a developer. For example, the first attribute threshold may be 0.

In a possible implementation, when the terminal determines that the first attribute value is lower than the first attribute threshold, it indicates that the life value of the virtual trap prop is reduced to 0. That is to say, the virtual trap prop has failed, and correspondingly, the first virtual prop may be immediately unmasked.

In an exemplary example, if the masking duration is 60 s, when the duration of the first virtual prop in a masked state is 30 s, it is detected that the life value of the virtual trap prop is reduced to 0. The first type of virtual props may be immediately unmasked when the duration is 30 s. It is not necessary to unmask only when the duration reaches 60 s.

In this embodiment, a first attribute value is set for the virtual trap prop, and it is determined whether an attribute value of the virtual trap prop is effectively associated with a masking function of the virtual trap prop. It is possible to prompt other virtual objects to actively attack the virtual trap prop, whereby the first type of virtual props may be unmasked as soon as possible, thereby further prompting a player to control the virtual object to actively participate in a battle.

In another possible implementation, if the second virtual object placing the virtual trap prop is killed, the corresponding virtual trap prop is also in an invalid state, and the function of masking the first type of virtual props correspondingly vanishes.

Figure 15:
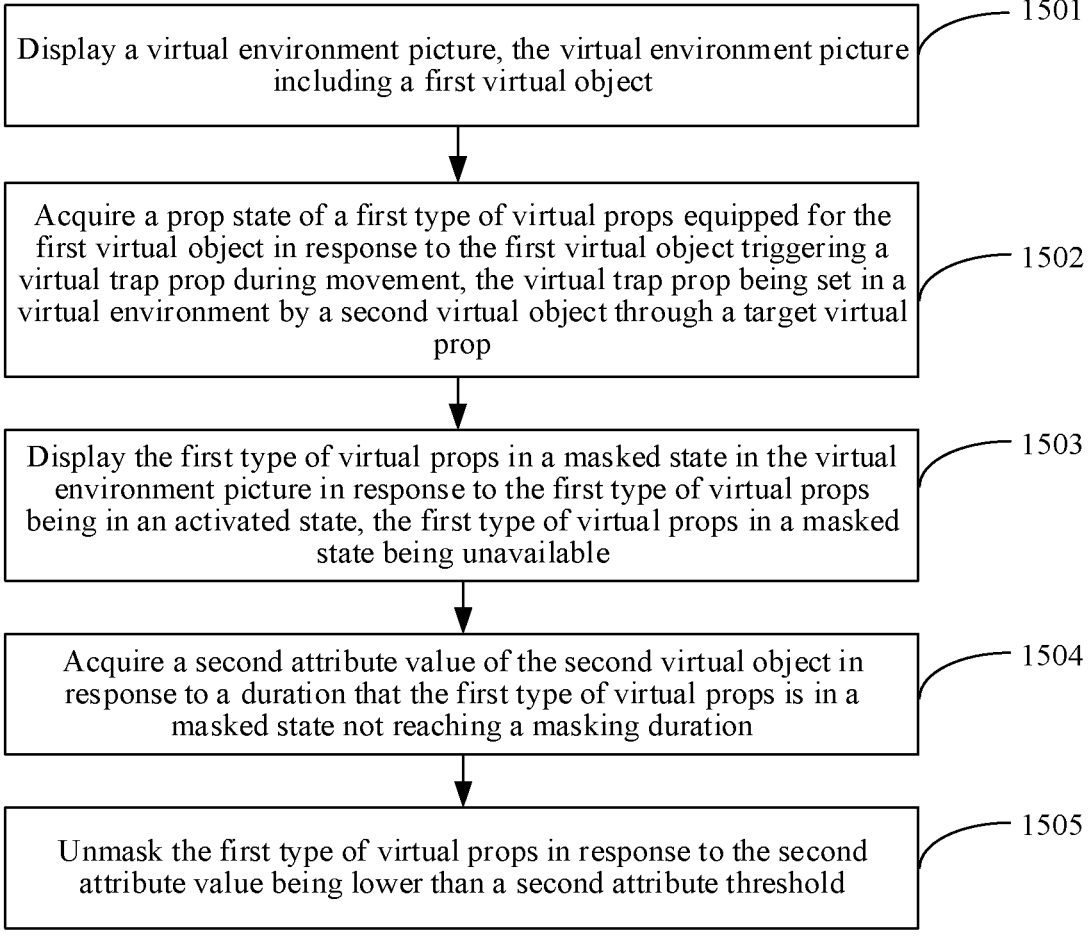
FIG. 15 shows a flowchart of a virtual object control method according to another exemplary embodiment of this disclosure.

In an exemplary example, as shown in FIG. 15, a flowchart of a virtual object control method according to another exemplary embodiment of this disclosure is shown. This embodiment is described by using an example in which the method is applied to the first terminal 110 or the second terminal 130 in the implementation environment shown in FIG. 1 or another terminal in the implementation environment. The method includes the following steps.

In step 1501, a virtual environment picture (virtual environment image) is displayed. The virtual environment picture includes a first virtual object.

In step 1502, a prop state of a first type of virtual props equipped for the first virtual object is acquired in response to the first virtual object triggering a virtual trap prop during movement. For example, in response to the first virtual object triggering a trap set in the virtual environment, it is determined whether props of a first type are in an active state or an inactive state for the first virtual object. The virtual trap prop is set in a virtual environment by a second virtual object through a target virtual prop.

In step 1503, the first type of virtual props in a masked state is displayed in the virtual environment picture in response to the first type of virtual props being in an activated state. For example, in response to a determination that the props of the first type are in the active state for the first virtual object, the props of the first type are displayed in a masked state in the virtual environment image. The first type of virtual props in a masked state is unavailable.

For the implementations of steps 1501 to 1503, reference may be made to the above embodiments, and details are not described again in this embodiment.

In step 1504, a second attribute value of the second virtual object is acquired in response to a duration that the first type of virtual props is in a masked state not reaching a masking duration.

The second attribute value may be a life value, a blood volume or a defense value of the second virtual object.

In this embodiment, whether the function of the virtual trap prop is valid is associated with the second attribute value of the second virtual object placing the virtual trap prop. That is, the second virtual object is killed. If the second attribute value is lower than 0, the masking function of the corresponding virtual trap prop correspondingly vanishes.

In a possible implementation, when the duration of the first type of virtual props in a masked state does not reach the masking duration, i.e. during the first type of virtual props in a masked state, a control terminal to which the second virtual object belongs may acquire a second attribute value of the second virtual object in real time and upload the second attribute value to the server, whereby the server issues the second attribute value to other clients, and other virtual objects may learn the second attribute value of the second virtual object in real time.

Correspondingly, the control terminal corresponding to the first virtual object acquires the second attribute value of the second virtual object issued by the server.

In step 1505, the first type of virtual props is unmasked in response to the second attribute value being lower than a second attribute threshold.

The second attribute threshold may be set by a developer. For example, the second attribute threshold may be 0.

In a possible implementation, when the terminal determines that the second attribute value of the second virtual object is lower than the second attribute threshold, the first type of virtual props may be unmasked immediately. That is to say, the first virtual object may use the first type of virtual props.

In an exemplary example, if the masking duration is 60 s and the duration of the first type of virtual props in a masked state is 20 s, the terminal learns that the second virtual object is killed at this moment. That is, the life value of the second virtual object is 0. The first type of virtual props is immediately unmasked at 20 s.

In this embodiment, the masking function of the virtual trap prop is associated with the attribute value of the second virtual object placing the virtual trap prop, and other virtual objects may be prompted to unmask the first type of virtual props in time by actively killing the second virtual object, so as to further improve the enthusiasm of a player for participating in a battle, shorten the battle duration and reduce the processing pressure of the server.

In a possible implementation, after the virtual trap prop is set in the virtual environment, even if the virtual trap prop is not triggered, the virtual trap prop does not always exist in the virtual environment, and when the virtual trap prop satisfies the vanishing condition, the setting of the virtual trap prop in the virtual environment is stopped. That is, the trap is removed.

The vanishing condition may include at least one of the following: a setting duration of the virtual trap prop reaches a setting duration threshold, a count of the virtual trap prop being triggered is greater than a count threshold, or a first attribute value corresponding to the virtual trap prop is lower than a first preset attribute threshold.

In the case where the setting duration of the virtual trap prop reaches the setting duration threshold, in a possible implementation, after the virtual trap prop is set in the virtual environment, the setting duration of the virtual trap prop is acquired, and when the setting duration of the virtual trap prop reaches the setting duration threshold, the virtual trap prop vanishes.

The setting duration threshold of the virtual trap prop may be preset by a developer. For example, the setting duration threshold may be 10 min.

In an embodiment, when none of the virtual trap props are triggered within the setting duration threshold, the virtual trap props vanish after the setting duration threshold is reached.

In the case where the count of the virtual trap prop being triggered is greater than the count threshold, in a possible implementation, the virtual trap prop cannot be triggered without limitation, and has a certain count threshold. When the count of the virtual trap prop being triggered exceeds the count threshold, the virtual trap prop also satisfies the vanishing condition.

The count threshold of the virtual trap prop being triggered may be preset by a developer. For example, the setting count threshold may be 5.

In the case where the first attribute value corresponding to the virtual trap prop is lower than the first preset attribute threshold, a corresponding first attribute value (blood volume) is set for the virtual trap prop. After the virtual trap prop is triggered, the first attribute value may be displayed, and other virtual objects may attack the virtual trap prop. After the first attribute value of the virtual trap prop is lower than the first attribute threshold, the virtual trap prop also satisfies the vanishing condition.

In a possible application scenario, by setting a target virtual prop provided by the embodiments of this disclosure, the balance of a game can be further maintained. Based on the principle that the target virtual prop may mask other virtual props, when a newly developed virtual prop is applied, it is found that the virtual prop has a greater prop power (no other prop may contend therewith), so that the game has a bug. If the game bug is found, a developer may need to readjust parameters of the virtual prop, repeatedly test the virtual prop and repeatedly adjust the parameters of the virtual prop so as to maintain the balance of the game. However, the efficiency of solving the game bug by debugging the parameters is low. However, the target virtual prop provided in the embodiments of this disclosure has the function of masking other virtual props. When the target virtual prop is used to solve the above game bug, it is not necessary to adjust the parameters of the virtual prop. When the bug is found, a certain virtual object in the virtual environment is equipped with the target virtual prop (or the target virtual prop is dropped randomly), and the target virtual prop is set to be valid for the virtual prop with the bug. That is to say, the target virtual prop may mask the virtual prop, thereby achieving the purpose that the game balance can be better maintained by a single virtual prop.

Figure 16:
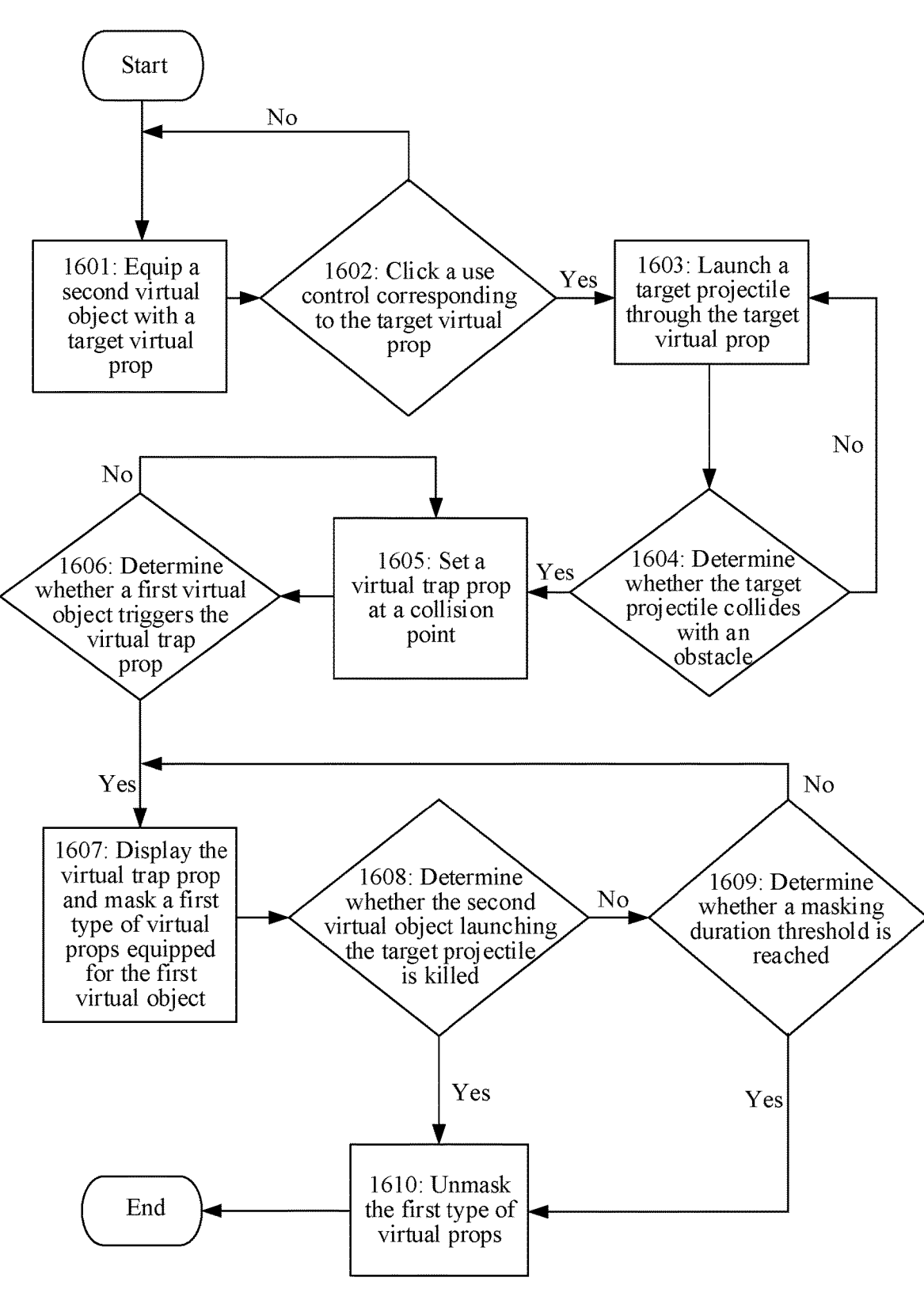
FIG. 16 shows a flowchart of a virtual object control method according to another exemplary embodiment of this disclosure.

In conjunction with the various embodiments described above, in an exemplary example, a virtual object control process is shown in FIG. 16.

In step 1601, a second virtual object is equipped with a target virtual prop.

In step 1602, a use control corresponding to the target virtual prop is clicked.

In step 1603, a target projectile is launched through the target virtual prop.

In step 1604, it is determined whether the target projectile collides with an obstacle.

In step 1605, a virtual trap prop is set at a collision point.

A user controlling the second virtual object equips the second virtual object with a target virtual prop. After entering a battle, when the target virtual prop is in an activated state, the second virtual object may be controlled to launch a target projectile through a use control corresponding to the target virtual prop. After the target projectile is in contact with an obstacle, a virtual trap prop may be set at a collision point between the target projectile and the obstacle.

In an embodiment, the virtual trap prop is visible to the second virtual object.

In an embodiment, when the target projectile collides with a virtual object, the target projectile does not affect the virtual object and continues to fall, and when the target projectile collides with other obstacles such as the ground or walls, the virtual trap prop is generated.

In step 1606, it is determined whether a first virtual object triggers the virtual trap prop.

In step 1607, the virtual trap prop is displayed, and a first type of virtual props equipped for the first virtual object is masked.

The first virtual object is a virtual object in different camps from the second virtual object. When the virtual trap prop is not triggered, the virtual trap prop is invisible to the first virtual object.

When the first virtual object triggers the virtual trap prop, the virtual trap prop is visible to the first virtual object, while the first type of virtual props equipped for the first virtual object is masked.

When the first virtual object is using the first type of virtual props, a use control or a fire control of the first type of virtual props is masked. When the first type of virtual props is not used by the first virtual object, a switching control of the first type of virtual props is masked. When the first type of virtual props of the first virtual object is in an inactivated state, an activation duration of the first type of virtual props is prolonged.

In step 1608, it is determined whether the second virtual object launching the target projectile is killed.

After the virtual trap prop is triggered by the first virtual object, the state of the second virtual object is determined in real time during a masking period when the first virtual object corresponds to the first type of virtual props. If the second virtual object is killed, the masking of the first type of virtual props by the virtual trap prop fails.

In step 1609, it is determined whether a masking duration threshold is reached.

After the virtual trap prop is triggered by the first virtual object, a masking duration for the first type of virtual props is determined during a masking period when the first virtual object corresponds to the first type of virtual props. If the masking duration reaches a masking duration threshold, the first type of virtual props is unmasked. In step 1610, the first type of virtual props is unmasked.

Figures 17, 18:
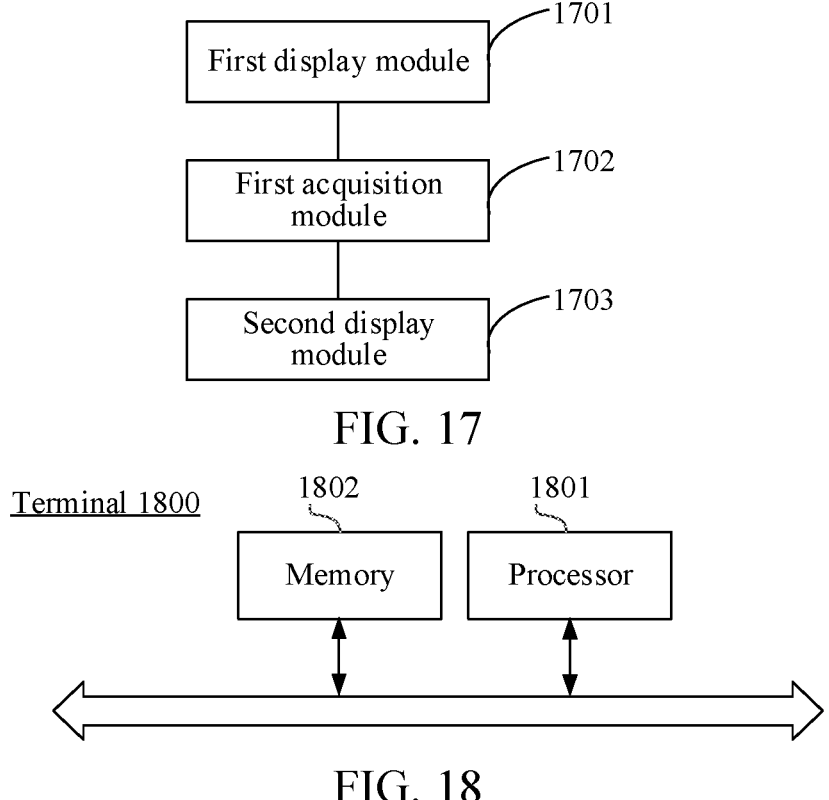
FIG. 17 shows a structural block diagram of a virtual object control apparatus according to an exemplary embodiment of this disclosure.
FIG. 18 shows a structural block diagram of a terminal according to an exemplary embodiment of this disclosure.

FIG. 17 shows a structural block diagram of a virtual object control apparatus according to an exemplary embodiment of this disclosure. The apparatus includes: a first display module 1701, configured to display a virtual environment picture, the virtual environment picture including a first virtual object; a first acquisition module 1702, configured to acquire a prop state of a first type of virtual props equipped for the first virtual object in response to the first virtual object triggering a virtual trap prop during movement, the virtual trap prop being set in a virtual environment by a second virtual object through a target virtual prop, the prop state including any one of an activated state and an inactivated state; and a second display module 1703, configured to display the first type of virtual props in a masked state in the virtual environment picture in response to the first type of virtual props being in an activated state, the first type of virtual props in a masked state being unavailable.

In an embodiment, the second display module 1703 includes: a first display unit, configured to display a switching control in a non-triggerable state in the virtual environment picture in response to a virtual prop currently used by the first virtual object not belonging to the first type of virtual props, the switching control being configured to switch the currently used virtual prop to the first type of virtual props; and a second display unit, configured to display a use control in a non-triggerable state in the virtual environment picture in response to a virtual prop currently used by the first virtual object belonging to the first type of virtual props, the use control being a use control corresponding to the first type of virtual props.

In an embodiment, the apparatus further includes: a first setting module, configured to set virtual props equipped for the first virtual object other than a second type of virtual props as a masked state, the second type of virtual props including at least one of throw-type virtual props, treatment-type virtual props, defense-type virtual props, and close range-type virtual props.

In an embodiment, the first display unit is further configured to display a switching control in a non-triggerable state in the virtual environment picture, and display a masking countdown through the switching control.

The second display unit is further configured to display a use control in a non-triggerable state in the virtual environment picture, and display a masking countdown through the use control.

The apparatus further includes: a first unmasking module, configured to unmask the first type of virtual props in response to reaching a masking duration.

In an embodiment, the apparatus further includes: a second acquisition module, configured to acquire a prop position and a prop display state of the virtual trap prop from a server, where the prop display state is a visible state in a case where the first virtual object and the second virtual object belong to a same camp, and the prop display state is an invisible state in a case where the first virtual object and the second virtual object belong to different camps; and a second setting module, configured to set the virtual trap prop in the virtual environment according to the prop position and the prop display state.

In an embodiment, the apparatus further includes: a third setting module, configured to set the prop display state corresponding to the virtual trap prop from an invisible state to a visible state in response to the first virtual object and the second virtual object belonging to different camps, and transmit a prop trigger message to the server, the server being configured to issue, according to the prop trigger message, a prop display state change message for instructing to set the prop display state corresponding to the virtual trap prop from an invisible state to a visible state.

In an embodiment, the apparatus further includes: a third display module, configured to display a first attribute value corresponding to the virtual trap prop, the first attribute value being reduced in a case where the virtual trap prop is attacked by a virtual object using a virtual prop.

In an embodiment, the apparatus further includes: a third acquisition module, configured to acquire the first attribute value corresponding to the virtual trap prop in response to a duration that the first type of virtual props is in a masked state not reaching a masking duration; and a second unmasking module, configured to unmask the first type of virtual props in response to the first attribute value being lower than a first attribute threshold.

In an embodiment, the apparatus further includes: a fourth acquisition module, configured to acquire a second attribute value of the second virtual object in response to a duration that the first type of virtual props is in a masked state not reaching a masking duration; and a third unmasking module, configured to unmask the first type of virtual props in response to the second attribute value being lower than a second attribute threshold.

In an embodiment, the apparatus further includes: an activation module, configured to prolong an activation countdown of the first type of virtual props in response to the first type of virtual props being in an inactivated state.

In an embodiment, the apparatus further includes: a fourth setting module, configured to stop setting the virtual trap prop in the virtual environment in a case where the virtual trap prop satisfies a vanishing condition including at least one of the following: a setting duration of the virtual trap prop reaches a setting duration threshold, a count of the virtual trap prop being triggered is greater than a count threshold, or a first attribute value corresponding to the virtual trap prop is lower than a first preset attribute threshold.

In conclusion, in the embodiments of this disclosure, a virtual trap prop is set in a virtual environment using a target virtual prop. When other virtual objects trigger the virtual trap prop during movement, a first type of virtual props equipped therefor may be set as a masked state, whereby other virtual props cannot use the first type of virtual props temporarily. A player may use the target virtual prop to mask a strongly attacking virtual prop of a hostile player, and the type of virtual props available for a virtual object may be further enriched. Meanwhile, the player may kill the hostile player during the period when other virtual objects cannot use the first type of virtual props, so as to improve the efficiency of killing other virtual objects, thereby shortening the battle duration, and further reducing the processing pressure of a server.

Referring to FIG. 18, a structural block diagram of a terminal 1800 according to an exemplary embodiment of this disclosure is shown. The terminal 1800 may be a portable mobile terminal, such as a smart phone, a tablet computer, an MP3 player, or an MP4 player. The terminal 1800 may be further referred to as other names such as user equipment and a portable terminal.

Generally, the terminal 1800 includes a processor 1801 (including processing circuitry) and a memory 1802 (including a non-transitory computer-readable storage medium).

The processor 1801 may include one or more processing cores, for example, a 4-core processor or an 8-core processor. The processor 1801 may be implemented by using at least one hardware form of a digital signal processor (DSP), a field-programmable gate array (FPGA), and a programmable logic array (PLA). The processor 1801 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1801 may be integrated with a graphics processing unit (GPU). The GPU is configured to render and draw content that needs to be displayed on a display screen. In some embodiments, the processor 1801 may further include an artificial intelligence (AI) processor. The AI processor is configured to process computing operations related to machine learning.

The memory 1802 may include one or more computer-readable storage media. The computer-readable storage medium may be tangible and non-transient. The memory 1802 may further include a high-speed random access memory, and a non-volatile memory such as one or more magnetic disk storage devices and a flash memory device. In some embodiments, the non-transient computer-readable storage medium in the memory 1802 is configured to store at least one instruction. The at least one instruction is executed by the processor 1801 to perform the virtual object control method provided in the embodiments in this disclosure.

A person skilled in the art may understand that the structure shown in FIG. 18 constitutes no limitation on the terminal 1800, and the terminal may include more or fewer components than those shown in the figure, or some components may be combined, or a different component deployment may be used.

An embodiment of this disclosure further provides a computer-readable storage medium, storing at least one program (including computer-readable instructions), the at least one program being loaded and executed by a processor to implement the virtual object control method described in the foregoing embodiments.

According to an aspect of this disclosure, a computer program product or a computer program is provided, the computer program product or the computer program including computer instructions, the computer instructions being stored in a computer-readable storage medium. A processor of a terminal reads the computer instructions from the computer-readable storage medium, and executes the computer instructions, to cause the terminal to perform the virtual object control method in various implementations of the foregoing aspect.

A person skilled in the art should be aware that in the one or more examples, the functions described in the embodiments of this disclosure may be implemented by using hardware, software, firmware, or any combination thereof. When implemented by using software, the functions can be stored in a computer-readable storage medium or can be used as one or more instructions or code in a computer-readable storage medium for transferring. The computer-readable storage medium includes a computer storage medium and a communication medium, where the communication medium includes any medium that enables a computer program to be transmitted from one place to another. The storage medium may be any available medium accessible to a general-purpose or dedicated computer.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A virtual object control method, comprising:

controlling display of a virtual environment, the virtual environment comprising a first virtual object;

in response to the first virtual object triggering a trap set in the virtual environment, determining whether a function of a virtual prop of a predefined type is available to the first virtual object, the trap being set in the virtual environment by a second virtual object and being configured to change an availability state of the predefined type of virtual prop; and in response to a determination that the function of the virtual prop of the predefined type is available to the first virtual object, switching the function of the virtual prop to an unavailable state, wherein a use control element is displayed in a non-triggerable state with a masking countdown based on the virtual prop of the predefined type being currently used by the first virtual object and the function of the virtual prop being switched to the unavailable state, the use control element being configured to trigger use of the virtual prop.

2. The method according to claim 1, wherein the switching the function comprises:

in response to a prop currently used by the first virtual object not being of a first type, displaying a switching control element in a non-triggerable state, the switching control element being configured to switch the currently used prop to a prop of the first type; and in response to the prop currently used by the first virtual object being of the first type, displaying the use control element in the non-triggerable state, the use control element being configured to trigger use of the prop of the first type.

3. The method according to claim 2, wherein, in response to the prop currently used by the first virtual object being of the first type, the method further comprises:

setting in the unavailable state props of the first virtual object not of a second type, the props of the second type comprising at least one of throw-type virtual props, treatment-type virtual props, defense-type virtual props, and close range-type virtual props.

4. The method according to claim 2, wherein the displaying the switching control element in the non-triggerable state comprises:

displaying the switching control element in the non-triggerable state in the virtual environment, and displaying a masking countdown through the switching control element;

the displaying the use control element in the non-triggerable state comprises:

displaying the use control element in the non-triggerable state in the virtual environment, and displaying the masking countdown through the use control element; and the method further comprises:

unmasking the props of the first type in response to the masking countdown reaching a masking duration.

5. The method according to claim 1, further comprising:

acquiring a position and a display state of the trap, wherein the display state is a visible state when the first virtual object and the second virtual object belong to a same camp, and the display state is an invisible state when the first virtual object and the second virtual object belong to different camps; and setting the trap in the virtual environment according to the position and the display state.

6. The method according to claim 5, wherein, in response to the first virtual object triggering the trap, the method further comprises:

transmitting a prop trigger message to a server, the server being configured to issue, according to the prop trigger message, a prop display state change message instructing to set the display state corresponding to the trap from the invisible state to the visible state; and setting the display state corresponding to the trap from the invisible state to the visible state in response to the first virtual object and the second virtual object belonging to different camps.

7. The method according to claim 1, wherein, in response to the first virtual object triggering the trap, the method further comprises:

displaying a first attribute value corresponding to the trap, the first attribute value being reduced when the trap is attacked by a virtual object.

8. The method according to claim 7, wherein, after the switching, the method further comprises:

acquiring the first attribute value corresponding to the trap in response to a duration of the function being in the unavailable state not having reached a masking duration; and switching the function to an available state in response to the first attribute value being lower than a first attribute threshold.

9. The method according to claim 1, wherein, after the switching, the method further comprises:

acquiring a second attribute value of the second virtual object in response to a duration of the function being in the unavailable state not having reached a masking duration; and switching the function to an available state in response to the second attribute value being lower than a second attribute threshold.

10. The method according to claim 1, the method further comprises:

in response to a determination that the function of the virtual prop of the predefined type is unavailable, an activation countdown of the function is increased by a predefined amount.

11. The method according to claim 5, wherein after the setting the trap, the method further comprises:

removing the trap in the virtual environment when a vanishing condition is satisfied, the vanishing condition comprising at least one of: a setting duration of the trap reaches a setting duration threshold, a count of the trap being triggered is greater than a count threshold, or a first attribute value corresponding to the trap is lower than a first attribute threshold.

12. A virtual object control apparatus, comprising:

processing circuitry configured to:

control display of a virtual environment, the virtual environment comprising a first virtual object; and in response to the first virtual object triggering a trap set in the virtual environment, determine whether a function of a virtual prop of a predefined type is available to the first virtual object, the trap being set in the virtual environment by a second virtual object and being configured to change an availability state of the predefined type of virtual prop; and in response to a determination that the function of the virtual prop of the predefined type is available to the first virtual object, switch the function of the virtual prop to an unavailable state, wherein a use control element is displayed in a non-triggerable state with a masking countdown based on the virtual prop of the predefined type being currently used by the first virtual object and the function of the virtual prop being switched to the unavailable state, the use control element being configured to trigger use of the virtual prop.

13. The apparatus according to claim 12, wherein the processing circuitry is further configured to:

in response to a prop currently used by the first virtual object not being of a first type, display a switching control element in a non-triggerable state, the switching control element being configured to switch the currently used prop to a prop of the first type; and in response to the prop currently used by the first virtual object being of the first type, display the use control element in the non-triggerable state, the use control element being configured to trigger use of the prop of the first type.

14. The apparatus according to claim 13, wherein the processing circuitry is further configured to, in response to the prop currently used by the first virtual object being of the first type, set in the unavailable state props of the first virtual object not of a second type, the props of the second type comprising at least one of throw-type virtual props, treatment-type virtual props, defense-type virtual props, and close range-type virtual props.

15. The apparatus according to claim 13, wherein the processing circuitry is further configured to in response to the prop currently used by the first virtual object not being of the first type, display the switching control element in the non-triggerable state, and display a masking countdown through the switching control element;

in response to the prop currently used by the first virtual object being of the first type, display the use control element in the non-triggerable state, and display the masking countdown through the use control element; and unmask the props of the first type in response to the masking countdown reaching a masking duration.

16. The apparatus according to claim 12, wherein the processing circuitry is further configured to acquire a position and a display state of the trap, wherein the display state is a visible state when the first virtual object and the second virtual object belong to a same camp, and the display state is an invisible state when the first virtual object and the second virtual object belong to different camps; and set the trap in the virtual environment according to the position and the display state.

17. The apparatus according to claim 16, wherein the processing circuitry is further configured to, in response to the first virtual object triggering the trap, transmit a prop trigger message to a server, the server being configured to issue, according to the prop trigger message, a prop display state change message instructing to set the display state corresponding to the trap from the invisible state to the visible state; and set the display state corresponding to the trap from the invisible state to the visible state in response to the first virtual object and the second virtual object belonging to different camps.

18. The apparatus according to claim 12, wherein the processing circuitry is further configured to, in response to the first virtual object triggering the trap, display a first attribute value corresponding to the trap, the first attribute value being reduced when the trap is attacked by a virtual object.

19. The apparatus according to claim 18, wherein the processing circuitry is further configured to, after switching the function to the unavailable state, acquire the first attribute value corresponding to the trap in response to a duration of the function being in the unavailable state not having reached a masking duration; and switch the function to an available state in response to the first attribute value being lower than a first attribute threshold.

20. A non-transitory computer-readable storage medium storing computer-readable instructions thereon, which, when executed by processing circuitry, cause the processing circuitry to perform a virtual object control method comprising:

controlling display of a virtual environment, the virtual environment comprising a first virtual object;

in response to the first virtual object triggering a trap set in the virtual environment, determining whether a function of a virtual prop of a predefined type is available to the first virtual object, the trap being set in the virtual environment by a second virtual object and being configured to change an availability state of the predefined type of virtual prop; and in response to a determination that the function is in the available state for the first virtual object, switching the function to an unavailable state, wherein a use control element is displayed in a non-triggerable state with a masking countdown based on the virtual prop of the predefined type being currently used by the first virtual object and the function of the virtual prop being switched to the unavailable state, the use control element being configured to trigger use of the virtual prop.

* * * * *